US011491477B2

(12) United States Patent
Schwartz

(10) Patent No.: US 11,491,477 B2
(45) Date of Patent: Nov. 8, 2022

(54) CORE PIPETTING MECHANISM AND METHOD

(71) Applicant: Henry Donald Schwartz, Manchester, MA (US)

(72) Inventor: Henry Donald Schwartz, Manchester, MA (US)

( * ) Notice: Subject to any disclaimer, the term of this patent is extended or adjusted under 35 U.S.C. 154(b) by 0 days.

(21) Appl. No.: 16/103,869

(22) Filed: Aug. 14, 2018

(65) Prior Publication Data

US 2019/0193072 A1 Jun. 27, 2019

Related U.S. Application Data

(60) Provisional application No. 62/544,195, filed on Aug. 11, 2017.

(51) Int. Cl.
*B01L 3/02* (2006.01)
*G01N 1/10* (2006.01)

(52) U.S. Cl.
CPC ........... *B01L 3/0217* (2013.01); *B01L 3/0275* (2013.01); *B01L 3/0279* (2013.01); *B01L 2200/0684* (2013.01); *B01L 2200/0689* (2013.01); *B01L 2300/0609* (2013.01); *B01L 2400/02* (2013.01)

(58) Field of Classification Search
CPC ........ B01L 3/00; B01L 3/0217; B01L 3/0275; B01L 3/0279; B01L 2200/0684; B01L 2200/0689; B01L 2300/0609; B01L 2400/02; B01L 3/021; G01N 1/10
See application file for complete search history.

(56) References Cited

U.S. PATENT DOCUMENTS

| | | | | | |
|---|---|---|---|---|---|
| 4,061,037 | A * | 12/1977 | Keegan | B01L 3/0231 | 73/864.17 |
| 4,099,548 | A * | 7/1978 | Sturm | B01L 3/0234 | 141/27 |
| 4,304,138 | A * | 12/1981 | Tervamaki | B01L 3/0234 | 422/928 |
| 4,593,837 | A * | 6/1986 | Jakubowicz | B01L 3/0275 | 222/144.5 |
| 4,905,526 | A * | 3/1990 | Magnussen, Jr. | B01L 3/0227 | 73/864.18 |
| 5,183,765 | A * | 2/1993 | Qureshi | B01L 3/0275 | 222/282 |

(Continued)

*Primary Examiner* — Brian J. Sines
(74) *Attorney, Agent, or Firm* — Intrinsic Law Corp.

(57) ABSTRACT

The present disclosure provides better aspiration and dispensing by a common innovative mechanism by (i) offsetting the diameter of a bottom piston (tube) with a slightly narrower top piston (rod) when the two are swept together by O-rings to give extremely fine resolution, thereby eliminating the need for any filamentous piston and sealing means, (ii) letting the bottom tube be swept alone without offset to give high flow (iii) using a tapered top rod with thick-walled compliant O-ring seals to increase the resolution multiplier another order or magnitude, (iv) an at-the-ready interpiston space for contact-free blowoff, including viscous samples, (v) dead space filler mandrels and an integrated small valve to reduce or eliminate interpiston and disposable tip space prior to aspiration, and (vi) a mechanism for storing energy during disposable tip pickup to shoot dispensed samples contact-free down into long tubes.

11 Claims, 32 Drawing Sheets

(56) References Cited

U.S. PATENT DOCUMENTS

| | | | | |
|---|---|---|---|---|
| 5,383,372 | A * | 1/1995 | Qureshi | B01L 3/0231 422/927 |
| 6,805,015 | B1 * | 10/2004 | Schwartz | B01L 3/022 417/488 |
| 7,185,551 | B2 * | 3/2007 | Schwartz | B01L 3/0217 73/864.16 |
| 2004/0231438 | A1 * | 11/2004 | Schwartz | B01L 3/0217 73/864.17 |
| 2015/0209777 | A1 * | 7/2015 | Petrek | B01L 3/0224 73/864.18 |

* cited by examiner

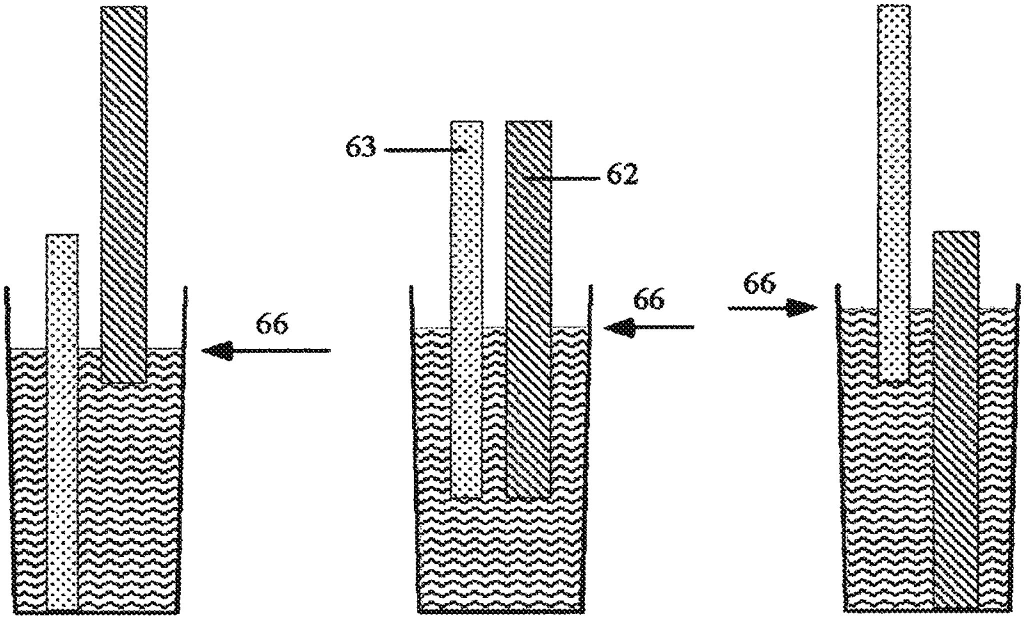
Figure 2A.1 Figure 2A.2 Figure 2A.3
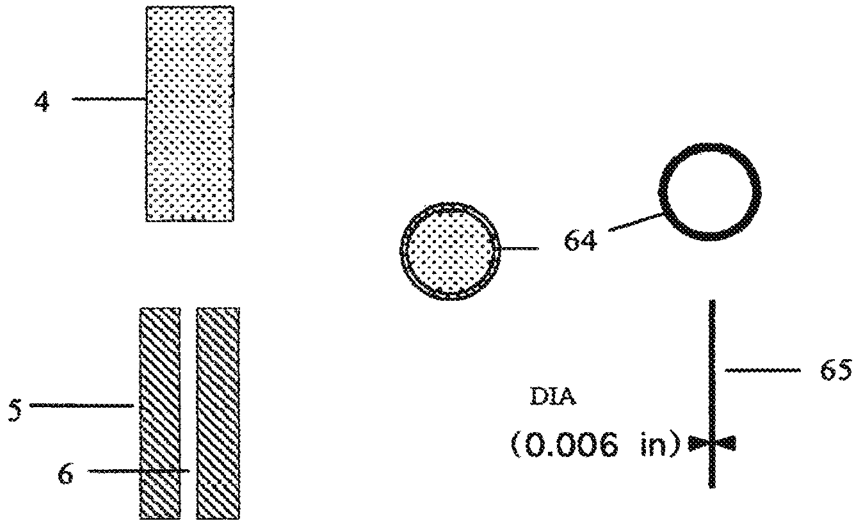
Figure 2B

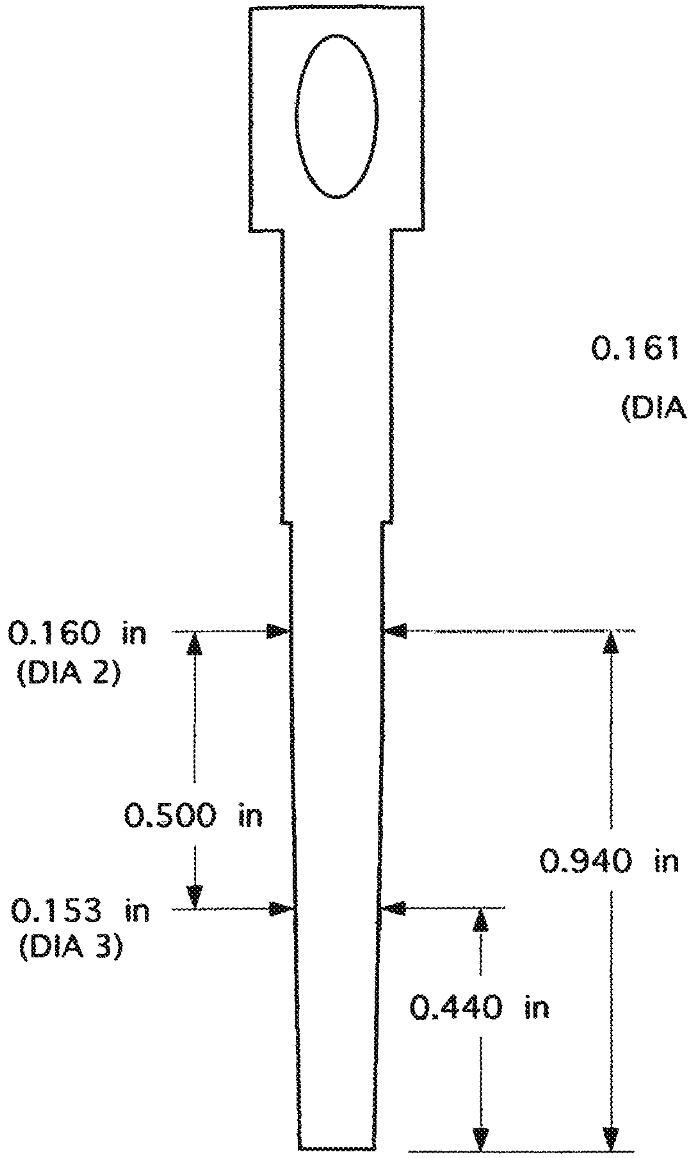
Figure 5A.1
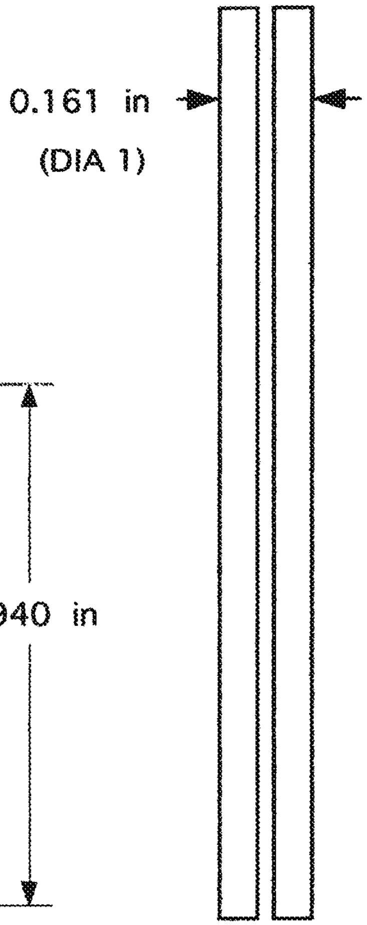
Figure 5A.2
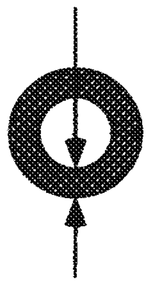
Figure 5A.3

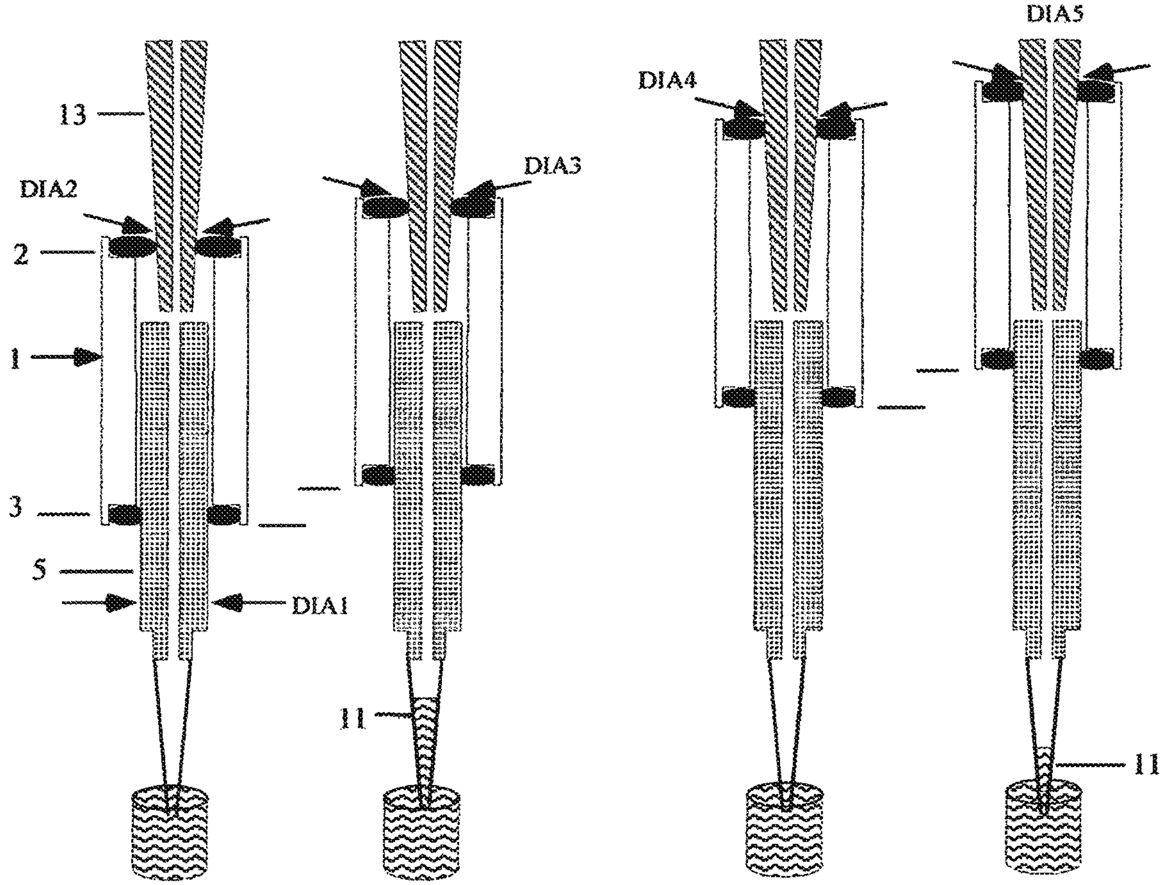
Figure 5B.1 Figure 5B.2 Figure 5B.3 Figure 5B.4

CORE PIPETTING MECHANISM AND METHOD

FIELD OF THE INVENTION

The present invention relates to air filled devices and pipettors for picking up small liquid volumes precisely and accurately and transferring them precisely and accurately to a desired destination in a way that is efficient, economical, and ergonomically acceptable.

INTRODUCTION TO THE INVENTION

A novel air-filled mechanism for metering and moving liquids is described. The inventive device is more precise, more accurate, more rugged and gives greater volume range. Embodiments of the invention provide both offset displacement and single displacement in designs that are readily retrofittable (OEM fashion) into multi-channel automated pipetting systems. Embodiments of the invention may also be implemented in free-standing manual units that accord with user's deeply ingrained habits and practices. Embodiments of the invention provide devices that provide greatly expanded volume range, superior accuracy and precision, far greater robustness and unprecedented freedom from missed and short aspirations. Embodiments of the invention also provide for contamination-free, contact-free delivery as well as traditional hanging drop delivery. Several embodiments are presented herein, including use of a tapered cylinder that multiplies even further an already huge 100-fold resolution multiplier, a switch to eliminate the hanging drop phase of dispensing if desired, and unique air dead space optimization for even greater accuracy.

The mechanism may use a cylinder with a relatively thick-walled, compliant O-ring seal at each end that slides over a bottom tube and a slightly narrower top rod to move liquids by offset-displacement with improved resolution or with very high flow without offset. The mechanism may aspirate, or suck in, tiny volumes without leaking, ensuring there are no missed or short volume outliers. The mechanism can dispense, or push out, the liquid very slowly to leave a hanging drop for touchoff or immersion delivery. Alternatively, the mechanism may dispense all the liquid very fast by high flow, crisp impact, contact-free and without contamination.

Embodiments of the mechanism can be used in many fields varying from the simple to the complex, for example from a core OEM component of large automated multi-channel systems to a free-standing handheld pipettor. Embodiments of the mechanism may be implemented and programed as part of multi-channel automated units utilizing conventional software logic which may eliminate routine duplicates or triplicates. Technologists can use certain embodiments as a hand-held unit without special training and may find they are freed from inspecting each tip.

According to one embodiment, a unique taper of the tube or rod can be used to provide an additional order of magnitude of relative volume offset resolution for accurate sub microliter pipetting. Vigorous mixing can be done with velocity and mixing efficiency that exceeds that of a conventional pipettor of comparable theoretical small volume resolution by 10 to 100 times.

BACKGROUND OF THE INVENTION

Pipetting is the one of the most common laboratory tests in the world. Virtually every laboratory uses pipettors and pipetting methods. There is, therefore, abundant data and information about how practitioners experience, adapt and feel about pipetting devices and procedures. Practitioners know that, in pipetting, either the thumb or the motor in an automated unit pulls up to suck a sample in and push down to push it out. Practitioners know that traditional pipetting procedures yield hanging drops that must be touched-off-and-dragged to fully deliver the sample to its intended location or receptacle. Practitioners have increasingly accepted the rationalization that touching the tip off or putting the tip under water and flushing it out during delivery is an unavoidable part of pipetting to get the remaining portion of a sample out of the tip, or to deliver a small sample at all. Each user also knows that when he or she is manually aspirating small volumes (anything below about 20 μL) that she will need to visually inspect each and every tip to make sure it isn't empty or has a visibly "short sample", as it is called. Such a step is necessary because practitioners often experience the misses and short samples that do occur, and must accordingly check after each dispensing operation. This causes eye strain and mental stress yet is an accepted part of what practitioners have to endure during regular, manual pipetting. Disciplined laboratory managers planning the automated system work flows will plan for doing many of their automated runs in duplicate or usually triplicate to protect against the occasional missed or "short outlier" aspiration that happens and will necessarily factor the large and expensive waste into their budgets.

Practitioners often welcome the new features of new devices, such as handles that feel a little nicer, tip ejections that are a little easier, prettier displays, and to a limited extent the attachment of integrated motors. Practitioners also desire an adjustable unit, but accept that about 10× is the maximum range for very high precision (1-10 μL or 2-20 μL) dispensing. Some may accept a group of fixed volume units that are color-coded that one can grab and use, but they need to be very cheap. But overall practitioners require that their hand operate in the usual and intuitive way for pipetting and are so accustomed to dispensing by angling a tip for touchoff-and-drag that they tend to angle it for aspiration as well.

What is needed therefore is a device and methodology to overcome the aforementioned shortcomings in a way that is economical, effective, efficient and comfortable to experienced technicians—but which feels like the pipetting they know so well—who may be hesitant to new or altered procedures.

SUMMARY OF THE INVENTION

Embodiments of the present invention provide devices and methodologies to replicate traditional pipetting motions and procedures, (i.e., hanging drops), however they will on their own find that they no longer have to inspect the tips each time, that the routine triplicate automated runs are no longer necessary, that just pointing the pipette tip towards the target and actuating the mechanism will send the small sample to its destination contact-free without introducing the contamination inherent to making contact with the receiving vessel. This may be accomplished in a controlled and safe manner. The disclosed embodiments and methodology will additionally provide a greatly expanded dynamic operating range.

The mechanism preferably uses a cylinder with a compliant O-ring seal at each end that slides over a bottom tube and a slightly narrower top rod, both of which are of substantial diameter and not filamentous, to move liquids by offset-displacement with improved resolution or with very high flow without offset. The mechanism may aspirate, or suck in, tiny volumes without leaking, ensuring there are no missed or short volume outliers. The mechanism can dispense, or push out, the liquid very slowly to leave a hanging drop for touch-off or immersion delivery. Alternatively, the mechanism may dispense all the liquid very fast by high flow, crisp impact, contact-free and without contamination.

The present invention does not use a single small piston or small seal even though tiny volumes such as nanoliters are metered. This is made possible by a unique offset displacement aspiration, permitting use of robust tubes and rods, which can use compliant O-rings that do not leak like the special seals that traditional pipettor manufacturers struggle with for the very skinny pistons used in such devices. Small sample aspirations are therefore not missed, technologists are spared mental stress inspecting tips, accuracy is improved, and money is saved.

The presence of single displacement along with the offset displacement provides the high flow power to deliver samples cleanly by contact-free blowout. Such a feature improves accuracy because, among other things, technologists in a laboratory will experience the similar results as traditional devices because the user technique variability that saddles the touch-off-and-drag delivery technique is eliminated.

BRIEF DESCRIPTION OF THE DRAWINGS

FIGS. 2A.1, 2A.2 and 2A.3 are a water glass analogy of the offset versus single displacement principle. FIG. 2B shows the offset displacement analogy principle in cross section.

FIG. 5A.1 shows the tapered rod, FIG. 5A.2 shows the straight tube and FIG. 5A.3 shows the thick-walled O-ring seal that work together as a system.

FIGS. 5B.1 and 5B.2 show how a large sample is aspirated when the chamber moves in the lower portion and FIGS. 5B.3 and 5B.4 show how a small sample is aspirated when the chamber moves in the upper portion.

FIGS. 8A, 8B and 8C show the aspirating sequence. FIGS. 8D, 8E and 8F show dispensing modes.

DETAILED DESCRIPTION OF THE DRAWINGS AND PREFERRED EMBODIMENTS

Figures 1A, 1B, 1C:
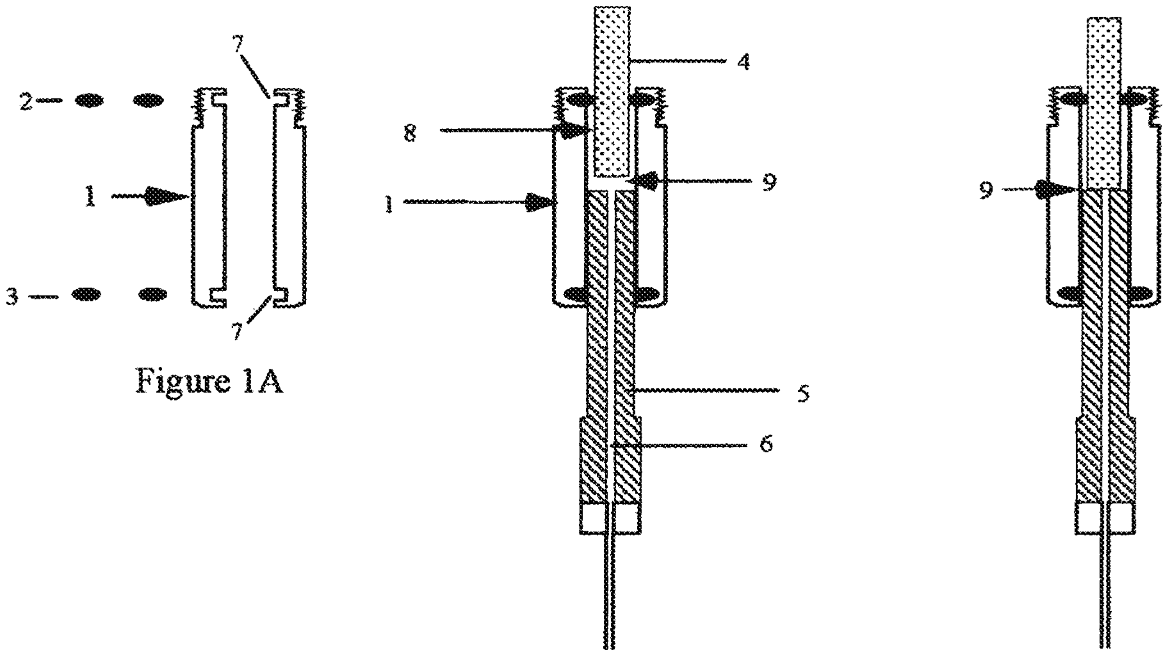
FIGS. 1A, 1B and 1C show an embodiment cylinder with upper and lower grooves holding relatively thick-walled compliant O-ring seals that takes in a bottom tube and a top thinner rod.

FIGS. 1A, 1B and 1C show one preferred embodiment of the invention's core mechanism in cross section. FIG. 1A shows the grooves 7 or glands inside the cylinder 1 which hold the relatively thick-walled and compliant top O-ring seal 2 and bottom O-ring seal 3. The seal material is typically a nitrile, such as nitrile 70 or buna N 70 B as commonly known in the industry, which seal has substantial compliance capabilities depending on its thickness. Any of the figures that follow that show a seal that is not an O-ring captured in an internal groove as is shown in FIG. 1 should be understood as if they may in fact of this type and capture. FIG. 1B shows that a top rod 4 and a wider bottom tube 5 enter the cylinder 1 concentrically through their respective top seal 2 and bottom seal 3 over which the cylinder 1 can move, and a tube channel 6 that is the only way for air to get in or out. The tube 5, in one embodiment, is typically not more than 0.006 inches wider than the rod 4 but the rod is shown much thinner so the difference can be readily seen. The inner air chamber 8 thus formed includes an air gap 9 between the tube and rod that can be closed by the rod as shown in FIG. 1C.

FIG. 2A.2 shows a larger piston or index finger 62 and a smaller piston or little finger 63 in a glass of water. The water level 66 reflects the amount the water rises and falls if you see-saw the two pistons. One piston or finger moving in and out alone would raise or lower the water level a substantial distance by "single displacement". But when two pistons of different diameters see-saw or move reciprocally, it is the difference in cross section diameter that determines how much displacement or water level movement there is, and that difference is very small compared to that from movement of only one piston. The difference in cross section area between the see-sawing submerged pairs of pistons times the common distance moved is the volume of water that is moved by offset displacement. With FIG. 2A.2 as the starting point, FIG. 2A.1 shows that when the larger piston withdraws from the liquid as the smaller one submerges more, the water level falls from "negative offset displacement". FIG. 2A.3 shows the opposite, in which the larger piston enters more the water as the smaller one leaves to cause the water level to rise from "positive offset displacement".

FIG. 2B is a cross section that shows how the tube and rod would operate in the invention to use the displacement principles. In the actual invention the two pistons are aligned vertically as shown. The top piston is a solid rod 4 like the thinner rod 63 (or little finger). The bottom piston is a tube 5 like the thicker piston 62 (or index finger) except that it has a channel 6 inside. Superimposing a cross section of the narrower rod 4 on the cross section of the wider tube 5 shows the volume difference as a thin annular ring 64, which shows in the drawing as much larger than the actual size difference so the principal can be better seen. The actual volume of the annular ring times the distance moved is the volume of liquid moved. FIG. 2B shows that for a single plunger or piston (as in a conventional syringe or pipettor) to have the same cross section area as that annular ring 64—and the same fine resolution—it would have to be a very thin piston 65. In one typical embodiment of the invention, a diameter difference is 0.005", the tube being 0.161" in diameter and the rod 0.156", which approximates the very fine resolution of a 50 μL syringe. When the top rod is 0.160" in diameter—only 0.001" thinner than the bottom tube—the resolution approximates a 10 μL syringe, so filamentous that it is impractical to seal in a traditional syringe or pipettor and is prone to leak; it would also have very little flow power to move the liquid out. But the present invention never uses a tiny pistons 65 because it provides the fine resolution from the diameter difference between the stout pistons 4, 5 and the relatively thick-walled and compliant O-ring seals that go with that. The O-rings for the invention with the 0.161" tube and 0.156" rod described above may typically have a wall thickness in the range of at least 0.042-0.046 inch—which are extremely resilient to leaking or cracking and the system thereby eliminates substantially all the sealing problems associated with the use of small pistons and small seals. Yet the cross section of the tube approximates a 1 mL (milliliter) syringe, and when it moves without offset in single displacement it has high flow and can blow samples completely off of the tip contact-free.

Figures 3A, 3B:
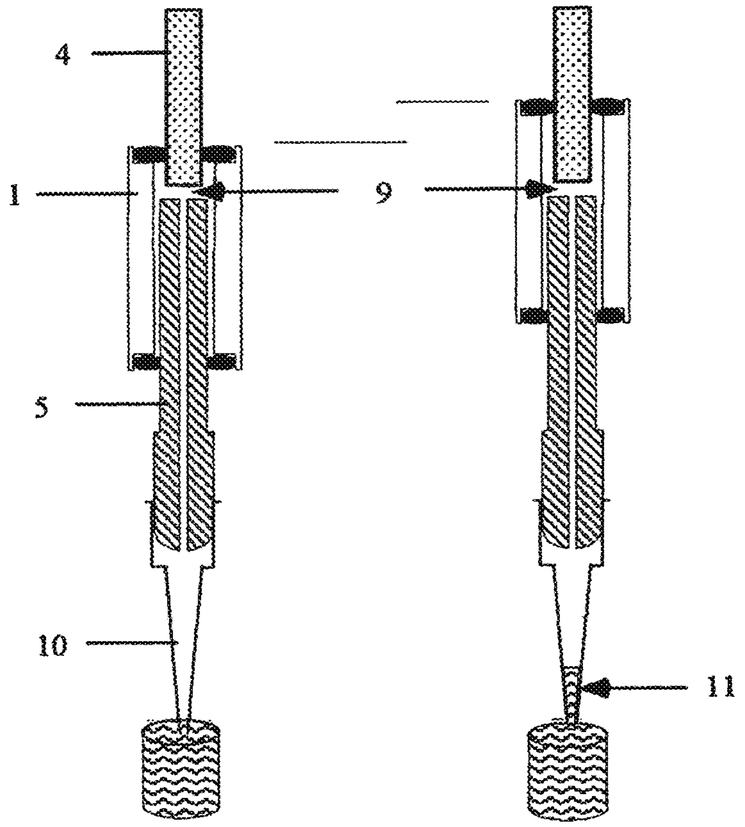
FIGS. 3A and 3B show the offset displacement aspiration mechanism.

FIG. 3A shows a disposable tip 10 dipped in a liquid sample. When the cylinder 1 and its two seals in FIG. 3A move up to the FIG. 3B position, more of the wider tube 5 leaves the common sealed chamber than thinner rod 4 enters, a negative offset displacement that creates a vacuum that aspirates the sample 11 extremely precisely. When the cylinder slides up, more mass is leaving the sealed chamber than enters it and the difference creates a vacuum that aspirates. The integrity of this aspiration is protected by the relatively thick-walled and compliant O-ring seals that do not leak, and the aspiration of small samples, such as under 1 microliter, will therefore not have low volume "outliers" and missed aspirations as occurs with some frequency with traditional devices because of the sealing weakness imposed by the need to use very thin or needlelike pistons. Note that the interpiston air gap 9 does not change during aspiration from FIG. 3A to FIG. 3B because neither the top rod nor the bottom tube have moved—only the cylinder 1 and its two seals moved. In a typical embodiment, the top rod diameter is 0.156 inches and the bottom tube diameter is 0.161 inches, a difference of 0.005 inches. When this diameter difference is swept by the two seals the resolution is like that of a 50 μL (fifty microliter) syringe, which is very fine and can aspirate a very small sample 11, such as 1 μL, very precisely at about 1% coefficient of variation CV and very accurately.

Figures 4A, 4B, 4C:
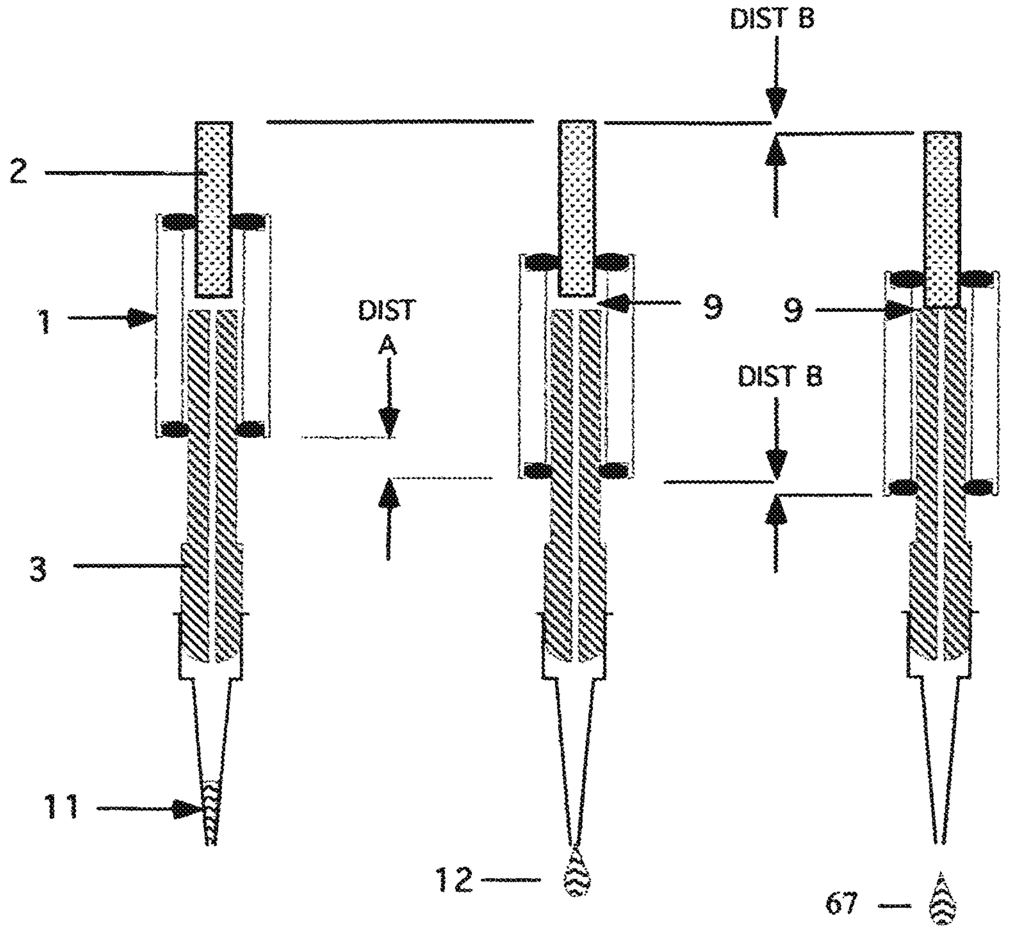
FIG. 4A shows an aspirated sample.
FIG. 4B shows the sample dispensed by offset displacement mode as a hanging drop.
FIG. 4C shows the sample dispensed by single displacement mode contact-free blowout.

FIGS. 4A-4B depict the offset displacement dispensing mode, according to one embodiment. The cylinder 1 moves down to a spring resistance stop (shown later). More of the wider tube 3 is taken into the common sealed cylinder 1 than thinner rod 2 leaves, yielding a positive offset displacement that creates pressure that dispenses the sample 11 very precisely and slowly, typically leaving a hanging drop 12 which needs to be touched off to the receiving site to be delivered. Users who want to dispense the liquid by the familiar touchoff-and-drag technique can stop here and do just that.

FIGS. 4B-4C depict the single displacement dispensing, according to this same particular embodiment. If the cylinder is pushed down further, below the resistance stop, then the top rod 2 is automatically linked to the cylinder 1 and is dragged down with the cylinder from hereon down. The cross section of the wider tube therefore fills and displaces the interpiston air gap 9 without any offset, providing a fast, crisp high flow of air that delivers the last volume drop contact-free 67. Used this way without the offset, the substantial 0.161 inch diameter of the bottom tube that moves alone to deliver the air blowout has the high flow and speed of an approximately 1 mL (one milliliter) syringe. If the user or instrument positions the unit relatively straight above the target site and just presses down to the bottom then the full sample, including the last drop, will blow out cleanly and go directly to the destination site, contact-free and contamination-free.

Looked at again, FIG. 4A to 4B shows the initial Offset Displacement phase in which the only thing that moves is the cylinder 1, with its two seals sweeping the non-moving top rod and bottom tube (distance DISTA, in this example of about 0.3 inches), used for the fine aspiration. FIGS. 4B-4C show the final Single Displacement phase in which the top rod moves down along with the cylinder (both distance DIST B in this example of about 0.050 inches) to close and eliminate the interpiston air gap 9 and thereby give the high flow contact-free delivery. FIGS. 3A-4C together therefore show that the resolution and flow in the particular pipetting unit of the invention described here ranges from that of a 50 μL syringe to that of an approximately 1 mL syringe, a 20-fold multiplier that is built in by the piston diameters. But any other arrangement that brings about the same relative movement of the cylinder and the two pistons in the same sequential order should give similar results.

FIGS. 5A.1, 5A.2, 5A.3, 5B.1, 5B.2, 5B.3 and 5B.4, show a core technology embodiment based on a downwardly tapered top rod used with an even thicker-walled O-ring that multiplies even more both the fineness of resolution for precise sub-microliter aspiration and the volume range. This same principle could be used where the taper is in the bottom tube instead of the top rod.

FIG. 5A.1 shows the actual dimensions of a tapered top piston that is used with the bottom tube of FIG. 5A.2 with an O-ring in FIG. 5A.3. The diameter of the bottom tube in FIG. 5A.2 is the same at all levels, 0.161 inches in this example. In contrast, the top rod in FIG. 5A.1 is tapered, the largest diameter within the operating range (DIA2) being 0.160 inches and its smallest diameter (DIA3) being 0.153 inches. The thick-walled compliant O-ring that can seal over this wide diameter range is shown in FIG. 5A.3 and its wall thickness (indicated by the arrows) is approximately 0.050 inches. Depending on what diameter level of the top rod this unit is operating, the resolution can be as fine as that of a 10 uL (microliter) syringe and the flow rate can be as high as that of an approximately 1 mL (milliliter) syringe, representing a 100-fold multiplier range of flow and resolution in the same small unit. For this reason, the unit has a total high precision operating range of 10 uL down to 0.2 uL with comfortable thumb excursion distance even at the lowest volume level because of the unique taper arrangement.

FIGS. 5B.1, 5B.2, 5B.3 and 5B.4 show how the above works in further detail.

FIG. 5B.1 shows a position for starting aspiration in which the cylinder 1 is in a low position, placing the top seal 2 where it engages the top rod at a low level on its taper where is diameter DIA2 is smallest, such as 0.153 inches, and thereby furthest from the fixed DIA1 diameter of the bottom tube, which is 0.161 in this example, a difference of 0.008 inches. FIG. 5B.2 shows that the cylinder 1 has moved up to finish the aspiration, brining the top seal 2 to a larger but still small diameter level DIA2 of the top rod, such as 0.154", which is 0.007 inches smaller than the bottom tube. Aspirating in this range produces the coarsest resolution, approximating a 100 uL syringe, and therefore aspirates the larger volume sample 11.

FIG. 5B.3 shows a position for starting aspiration in which the cylinder starts in a higher position, where the top seal engages the top rod at a higher level on its taper where its diameter DIA4 is almost largest, such as 0.159", very close to the fixed bottom tube diameter DIA1. When the cylinder moves up to finish the aspiration it brings the top seal to the top rod's largest diameter level DIA5, which is 0.160" in this example, only 0.001" narrower than the bottom tube. Aspirating in this range produces the finest resolution, approximating that of a 10 uL (ten uL) syringe, and there aspirates the smaller volume sample 11 that is shown in FIG. 5B.4.

Therefore, aspirating over the same vertical distance in the wider (top) region of the top rod, where the diameter difference between the rod and the tube is least, aspirates far less volume at much finer resolution and precision. When the O-ring seal sweep starts where the diameter of the tapered rod is only 0.002" narrower than the bottom tube and finishes where the diameter of the tapered rod is barely 0001" narrower than the bottom tube the resolution is extraordinarily fine, similar to that of a 10 uL syringe (but without any very skinny piston or small seal) and able to aspirate a tiny sample very precisely and accurately FIGS. 3A through 4C showed an example with bottom tube 0.161" diameter and top rod 0.156" diameter that gave a resolution and flow multiplier of 20 fold—from that of a 50 μL syringe to that of a roughly 1 mL syringe, and a high precision pipetting operating volume range of 10 uL down to 1 uL. But adding the taper in this example in FIGS. 5A.1 through 5B.4, in which the bottom tube is the same 0.161 inch diameter but the top rod has the taper, gives a resolution and flow multiplier of 100 fold—from that of a 10 μL syringe to a roughly 1 mL syringe. Utilizing the taper, the offset displacement precision pipetting operating range maximum is the same 10 μL but the minimum volume now goes down to 0.2 uL (200 nanoliters), which is 5 times lower because the taper provides increasing and practical thumb excursion distance to accompany the increasingly fine resolution.

Another more extreme embodiment uses a top rod that is tapered from 0.160 inches down to 0.146 inches with a thicker O-ring seal whose cross section diameter is 0.075 inches. This O-ring wall thickness is fully half (50%) the diameter of the rod and tube it sweeps. This exploits even further the compliance of the O-ring technology to seal solidly over such a wide and dynamic range. This lets the high precision operating pipetting aspiration volume go from 20 μL all the way down to 0.2 μL (or 200 nanoliters) in the same unit—with comfortable and stable aspiration excursion thumb operating distance even at the lowest levels. The offset differential relationship for certain solutions may be non-linear throughout the operating range, but is perfectly predictable by mathematically integrating the diameter and $\pi(r)^2$ cross section areas, as can be done by a customized vernier scale or within an electronic processor. Not shown, but operating on exactly the same principle, is an embodiment in which it is the bottom tube that is tapered, rather than the top rod.

Figure 6A:
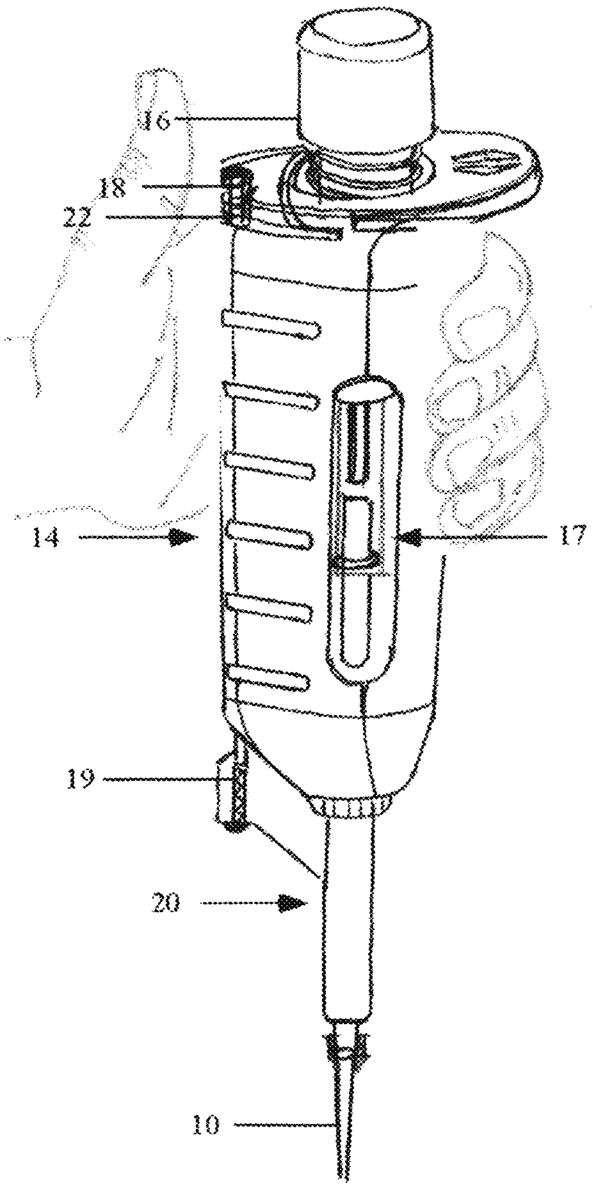
FIG. 6A is a common embodiment with a molded Handle and a viewing window that shows the liquid metering system.

FIG. 6A shows a molded handle 14 handheld pipettor embodiment with a large oval viewing and ventilating window 17. Ambient air circulates through the window to stabilize the temperature of the pipetting mechanism operating environment. The window may have a removable cover, which may be transparent, through which the user can see the operating mechanism during use. A person's thumb pushes down on the top pusher knob 16 to control pipetting movement. A tip ejector button 18 is used to push the tip ejector rod 19 and tip ejector 20 down to eject a disposable tip 10. A tip ejector spring 22 returns the tip ejector back up. The handle holds an inner cylindrical sleeve that nests within it.

Figure 6B:
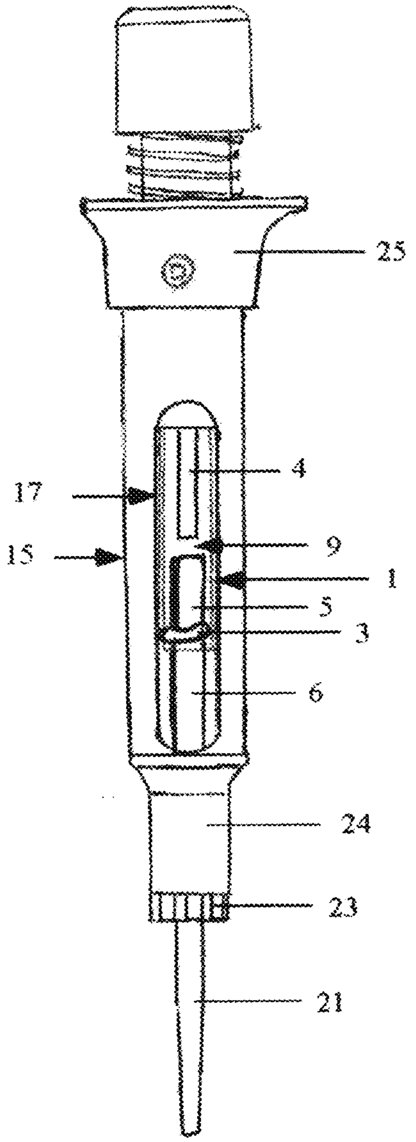
FIG. 6B shows the inner Cylindrical Sleeve that nests inside the handle that contains the core operating system.

FIG. 6B shows the inner cylindrical sleeve 15 that has been removed from the molded handle in which it typically rests. In this particular embodiment, the inner sleeve 15 supports all of the operating parts except for the tip stripper mechanism. The inner sleeve can therefore be held separately to perform all the pipetting functions except for tip ejection, which can be done with a small separate device A holding flange 25 can also be put over the inner sleeve so that it can be held and used like an injector device if desired. Through the window one can see the transparent cylinder 1, the top rod 4, the bottom tube 6 passing through the bottom seal 3, and the air gap 9 (aka interpiston air space) between them that is normally present in the resting position. The mandrel 21 has a mandrel knob 23 to attach and remove it from the sleeve nose 24.

Figure 6C:
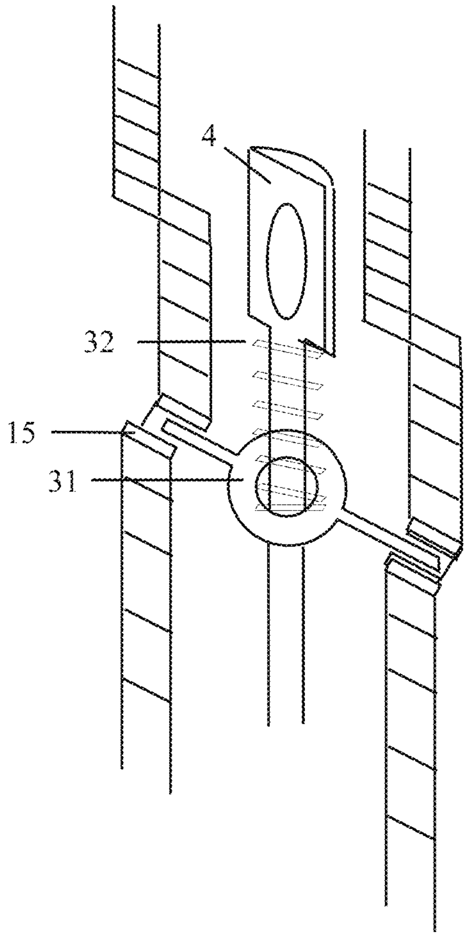
FIG. 6C is a sketch that shows top piston support details and FIG. 6D is an isometric exploded cross section that shows details of the cross pin function.

FIG. 6C shows that the top rod 4 is ever urged upward by a top rod spring 32 that is seated on a round spring floor 31. The spring floor 31 has two arms that sit firmly on the ledge of the inner sleeve 15 at both sides. The spring floor does not move down when the entire pusher/chamber assembly moves up and down and the arms of the spring floor are cleared through two additional vertical slots in the pusher body (not shown).

Figure 6D:
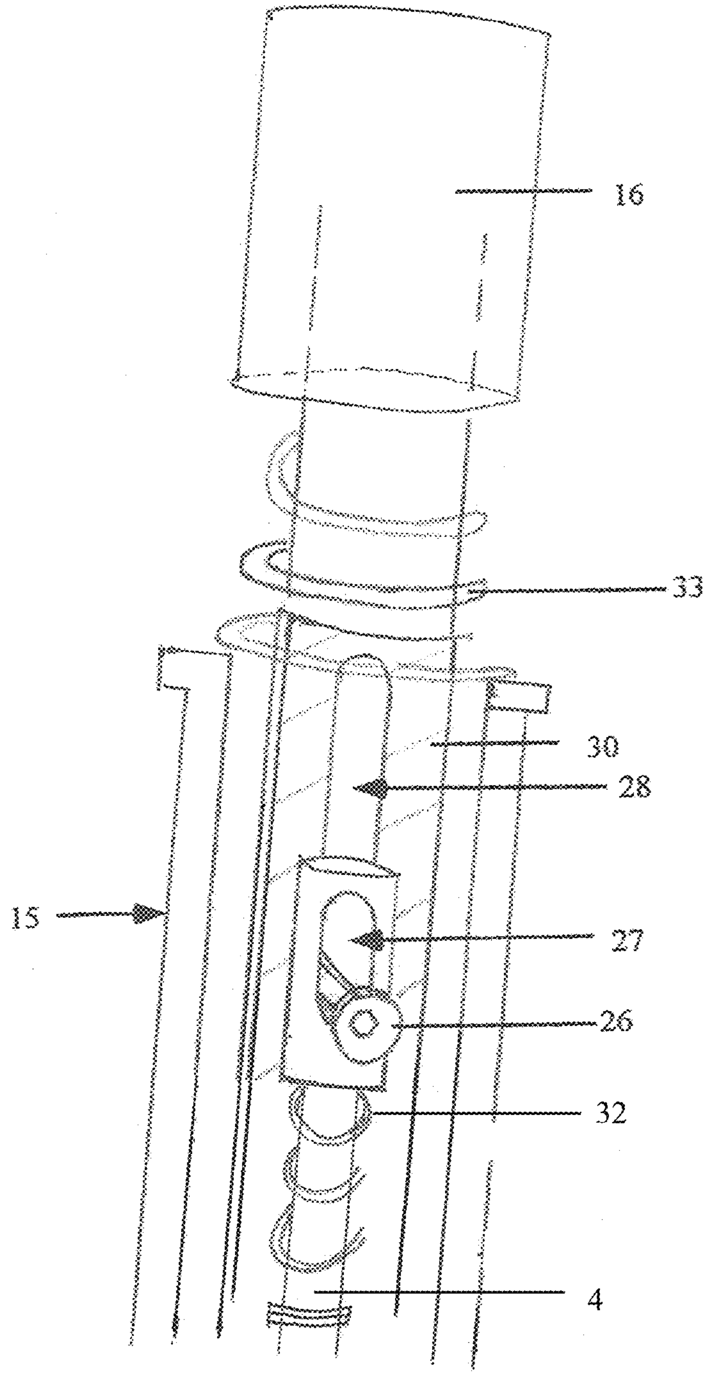

FIG. 6D shows a cross pin 26 that is anchored to the sleeve 15 and passes through the slots in the top rod 27 and the slots in the sides of the pusher 28. The cross pin limits how high up the top rod 4 can go, the top rod being always urged upwards by the top rod spring 32. The same cross pin also limits how high up the pusher 30 can go, the pusher being always urged upwards by the pusher spring 33. The cross pin also prevents rotation of the pusher when the pusher/volume adjuster knob 16 is turned to thread down into the pusher body to set the aspiration volume.

Figure 7:
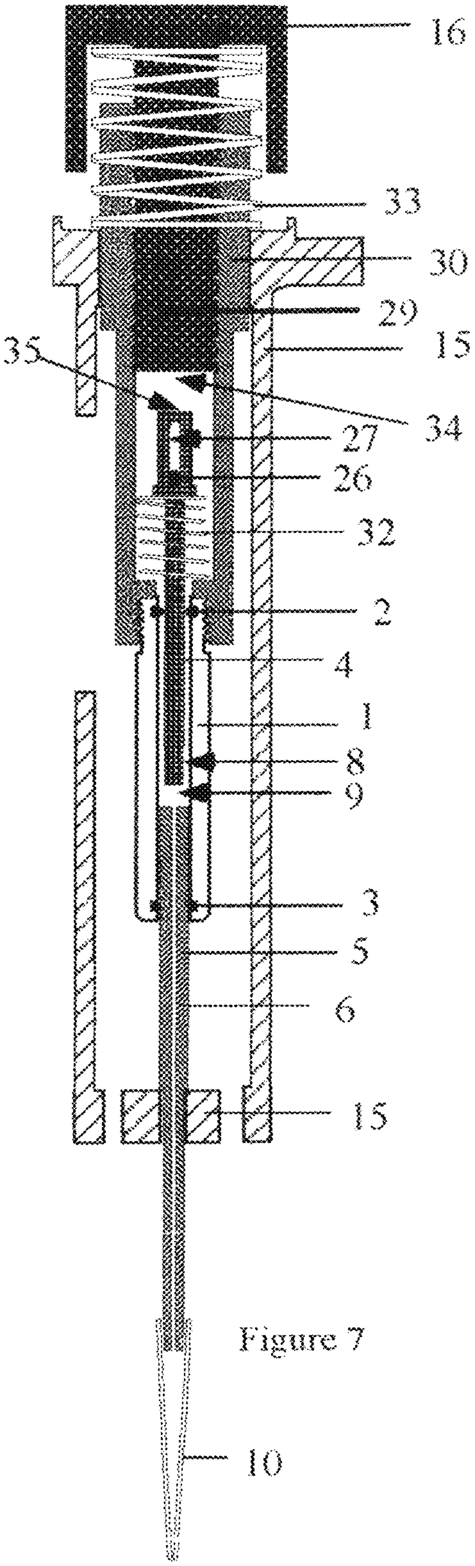
FIG. 7 is a cross section of an open frame design that will be convenient to show various other features to follow, and "cross section" will not be repeated where it is obvious.

FIG. 7 shows an open frame design that supports the core mechanisms. This design will be convenient to show various features from here on. The bottom tube 6 is held permanently in the bottom of the frame 15. The rod 4 is biased upward and held up by the rod spring 32, which is supported by a floor that is anchored to the inside of the frame by pins that are cleared through side slots in the pusher so that the rod spring base does not move when the pusher moves. The highest position is limited by the cross pin 26 that is also anchored to the frame. The Cross Pin 26 anchored to the frame 15 passes through the slot in the rod 27 and slots in the pusher, both rod 27 and pusher 30 being ever urged upward by their respective springs: both the rod and the pusher upward movement is stopped when the bottom of their respective slots hits the cross pin. The user's thumb overcomes the pusher spring 33 resistance in pushing the pusher knob 16 down to move down the pusher, the bottom of which is threaded into the top of the cylinder 1 at the bottom. According to one embodiment, the top pusher cap 16 threads the pusher further down, bringing the bottom of the pusher stalk 34 to the desired distance from the top of the rod 35, which is the distance that determines how much volume will be aspirated when the assembly moves back up. The "resistance stop" referred to herein is the resistance from the rod spring 32 felt when the bottom of the pusher stalk 34 reaches the top of the rod 35; that is the end of the low flow offset differential zone. Pushing further downward overcomes the resistance of the rod spring and causes the rod itself to move down with the cylinder.

Figure 8A:
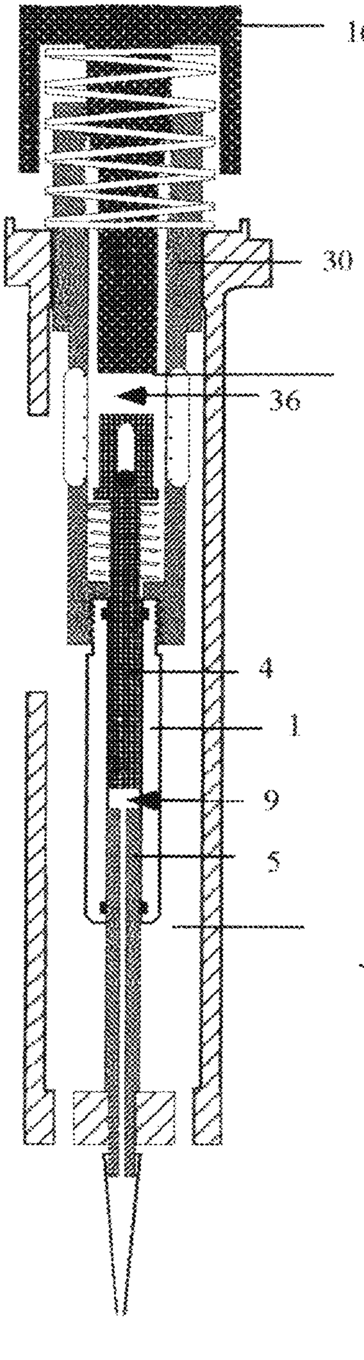
FIGS. 8A-8F use the open frame design to show the entire aspirating and dispensing sequence, with both the low flow hanging drop and high flow contact-free dispensing.

FIG. 8A shows a starting position in which the aspiration distance 36 has been set.

Figure 8B:
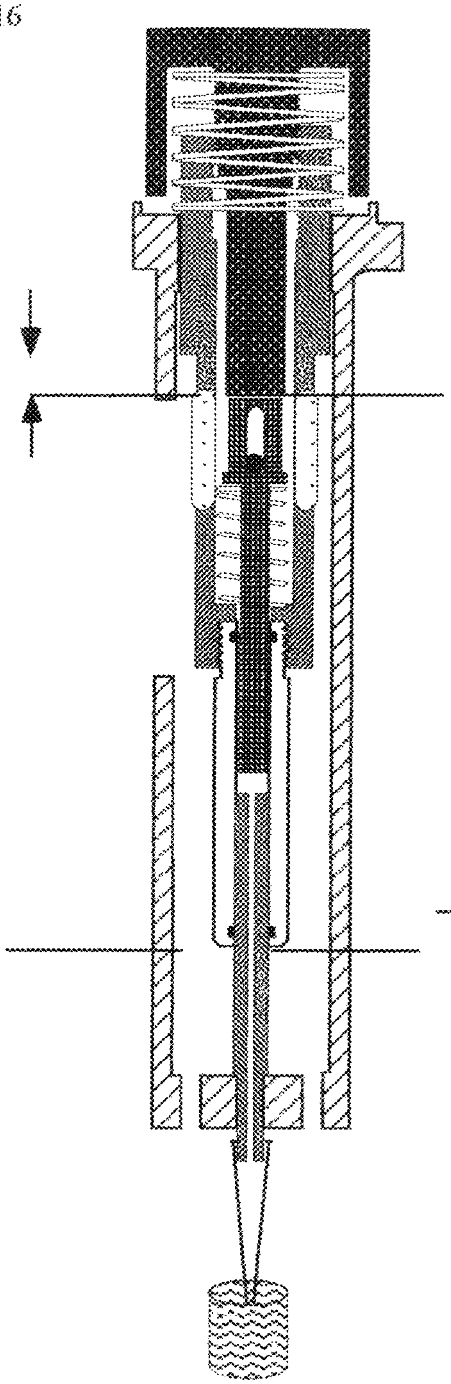

In FIG. 8B the user pushed the pusher knob 16 down until the bottom of the pusher reached the top rod 4 and encountered the resistance stop from the top rod spring, thus traversing and closing the aspiration distance 36. The attached cylinder assembly moved down the same distance and the two seals swept down the same distance over the unmoved bottom tube 5 and narrower top rod 4. The tip is placed in the sample.

Figure 8C:
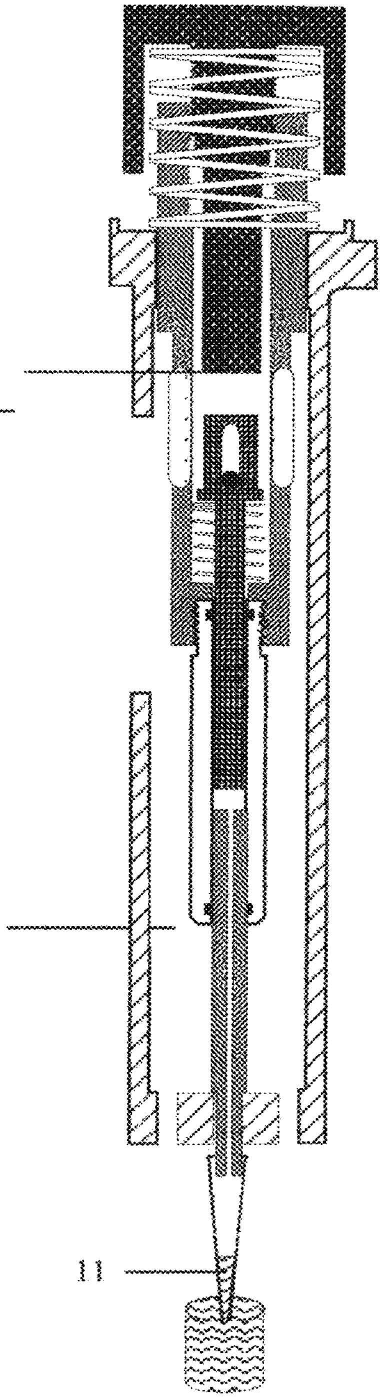

FIG. 8C shows that the user released the pusher knob 16 so that the pusher spring could lift the whole cylinder/seal assembly back up. More of the slightly wider bottom tube left the cylinder than slightly narrower top rod entered it, creating the offset displacement vacuum which aspirated the sample 11. Note that the aspiration distance 36 that was closed in FIG. 8B was restored in FIG. 8C but that neither piston moved and the interpiston space 9 remained unchanged.

Figures 8D, 8E, 8F:
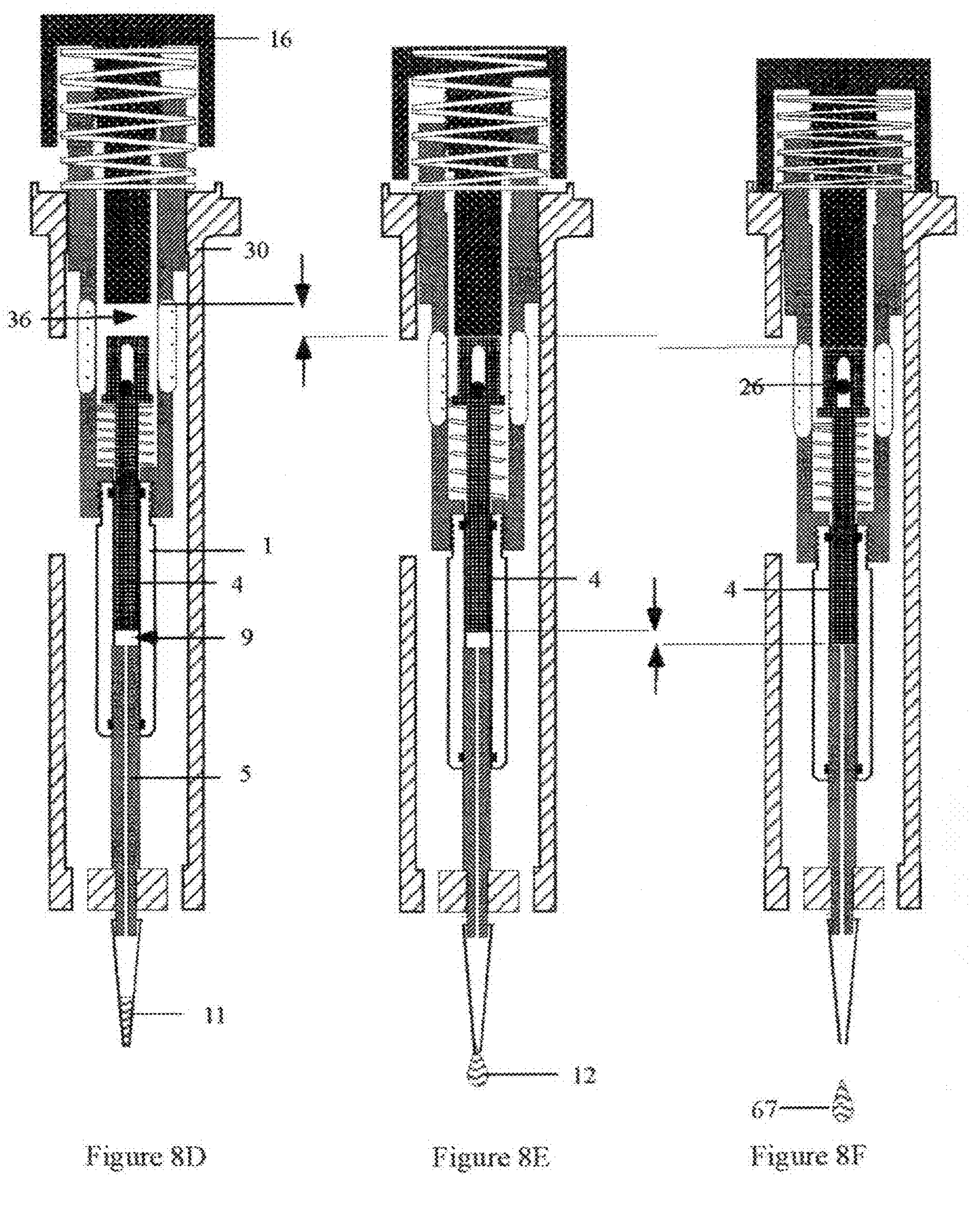

FIG. 8D shows the sample 11 aspirated in the tip. In FIG. 8E the pusher knob 16 is pushed down until its bottom stalk reaches the top rod and encounters the spring resistance stop, thus travelling the same distance as occurred during aspiration but in the opposite direction. The slightly wider bottom tube 5 has entered further into the cylinder 1 while the narrower top rod 4 has withdrawn from the cylinder, causing a very fine and positive offset displacement dispensing that dispenses the sample down to a hanging drop 12, the same hanging drop as conventional fine volume pipettors give. A user could stop here and deliver the final drop by touchoff-and-drag, or immersion in a receiving liquid, as with conventional pipetting, if the user wished.

FIG. 8F shows that pushing the rod down further beyond the resistance stop makes the rod travel down with the cylinder assembly, also visible because the cross pin 26 now shows up higher in the top rod slot, enabling the bottom tube to close the interpiston air gap 9 alone, thereby releasing the high flow power of the full large cross section to blow the sample out contact free 67. If one pushes all the way to the bottom directly from the position in FIG. 8D to that in FIG. 8F then the sample will be substantially completely blown off contact free without any intermediary hanging drop appearing, which is preferable because there is no opportunity for a lingering hanging drop to creep out of the tip and up around the outside of the tip.

For possible additional mechanism clarification, the aspiration distance 36 is also shown as AD to mean aspiration distance, but also as DHDD to mean distance for hanging drop dispense because the two are the same distance.

Figure 9A:
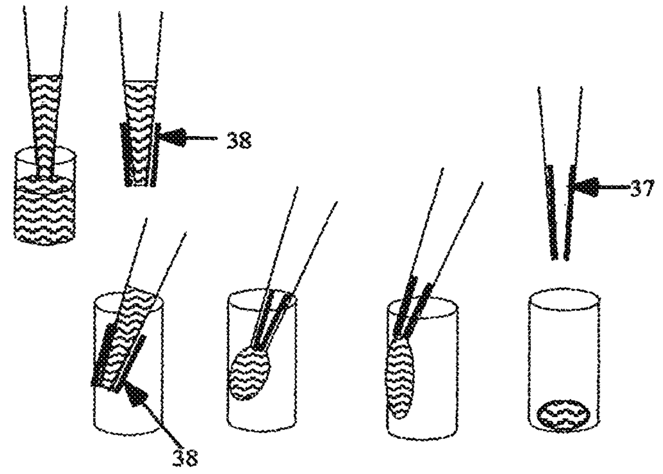
FIGS. 9A-9B depict the details at the end of the tip when a sample is dispensed by hanging drop versus by contact-free blowout that affect precision and accuracy.
Figure 9B:
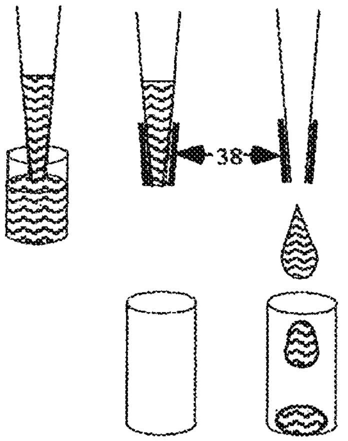

FIGS. 9A and 9B depict at a low level the details at the end of the tip when a sample is dispensed by both hanging drop or by contact-free blowout to show some aspects of how each option affects precision and accuracy.

FIG. 9A shows conventional contact touchoff-and-drag dispensing. The delivery requires positioning the tip at an angle in the receiving container for touchoff-and-drag, or sometimes immersion in a receiving liquid. After aspiration some sample is retained outside the tip 38. When the tip touches the receiving container during the touchoff-and-drag dispense procedure, some of the outside clinging liquid drawn or wicked off by capillary and surface tension action. At the end of the delivery when the tip is withdrawn, the figure shows that there is no longer sample on the outside of the tip, because it was wicked off in the container. Also, because of the very low flow from conventional fine pipettor delivery some aspirated sample typically remains inside the tip 37. These effects are sometimes small but generally significant. With this conventional method of delivery, the result is that wicked off volume is added from outside the tip, some of the aspirated volume is retained inside the tip, and there is significant variation from differences in user technique that go with the touchoff-and-drag delivery technique, all of which reduce precision and accuracy.

FIG. 9B shows dispensing contact-free in the non offset displacement mode of the present invention. After aspiration some sample is retained clinging to the outside of the tip 38, as in all aspiration. The tip is moved over (not into) the desired receiving site. Pushing the knob to the bottom blows the aspirated sample cleanly off into the receiving container without the tip at any time contacting the receiving container. There can be no wickoff of the extra sample liquid clinging to the outside of the tip, and substantially all of that outside clinging retention volume 38 is left behind on the outside of the tip. The high flow rate of the instant invention blows the aspirated sample out from inside the tip much more completely than conventional fine pipettors with their much lesser flow power can do. Also, the simpler point and push dispensing is free of user technique variation. All these improve precision and accuracy.

Figure 10:
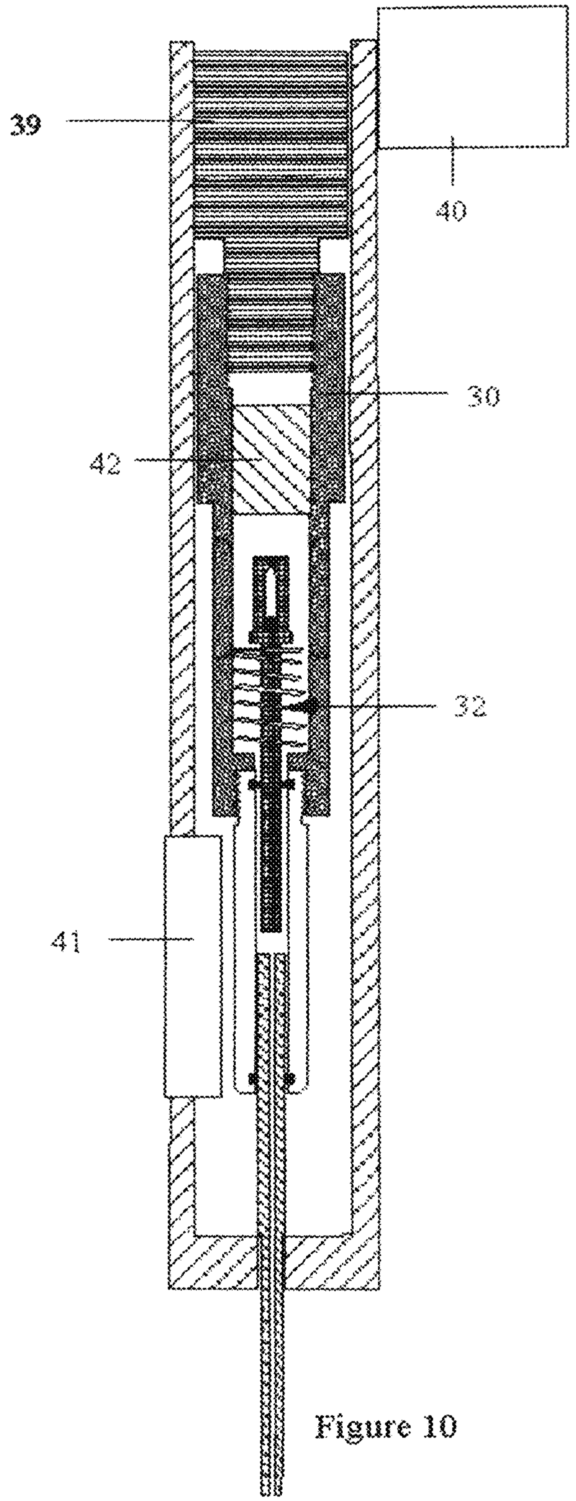
FIG. 10 shows a handheld embodiment that has a self-contained motor and smart display.

FIG. 10 shows a handheld embodiment that includes a self-contained motor and smart display. The motor 39 can be a stepper or a DC drive, or linear drive, such as a 9 mm diameter Maxon. The motor may have a threaded shaft that engages the pusher 30 that moves the pusher and associated cylinder assembly up and down. The motor may have an extension shaft 42 or block, which is shown here only schematically, that can extend further down and move independently of the main pitch or be geared to it, such as a 2:1 or 4:1 gear ratio, as would be familiar to persons skilled in this art. The motor, according to one embodiment, replaces a person's thumb, reducing greatly the strength needed from the top rod return spring 32. An intelligent display 40 lets the user select what mode he wants (aspirate, dispense, repetitive functions, etc.), what volume is desired, and other functions, and the display will inform that and other information. This permits repetitive dispensing, and makes practical a reverse action in which the bottom tube is narrower than the top rod. A motor is useful for use with the tapered rod embodiment (shown in FIG. 5), where the liquid-metering resolution and desired volume may not follow a linear relationship and may follow a more complex mathematical function but vary precisely with location, which information can be stored mathematically as an integrated function or even empirically based on calibration. An alternative location for a simpler display 41 may be preferred for simply displaying the volume that has been selected.

FIGS. 11A-11D show calibration of adjustable volume units.

Figure 11A:
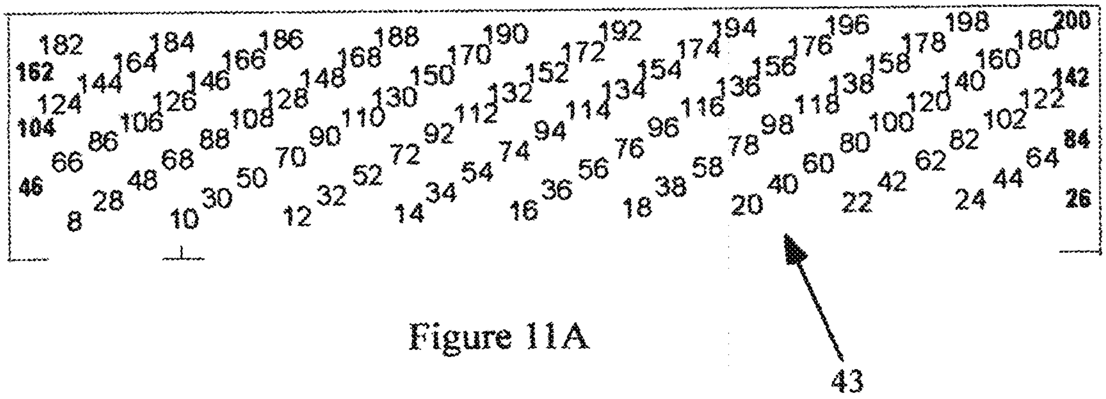
FIGS. 11A and 11B show the volume adjustment and viewing in adjustable volume pipettors.
Figure 11B:
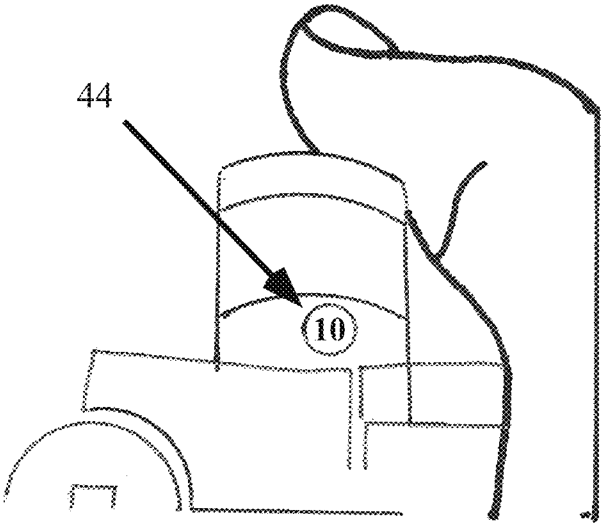

FIGS. 11A-11B show the vernier scale/viewing hole method for completely manual units.

Figure 11C:
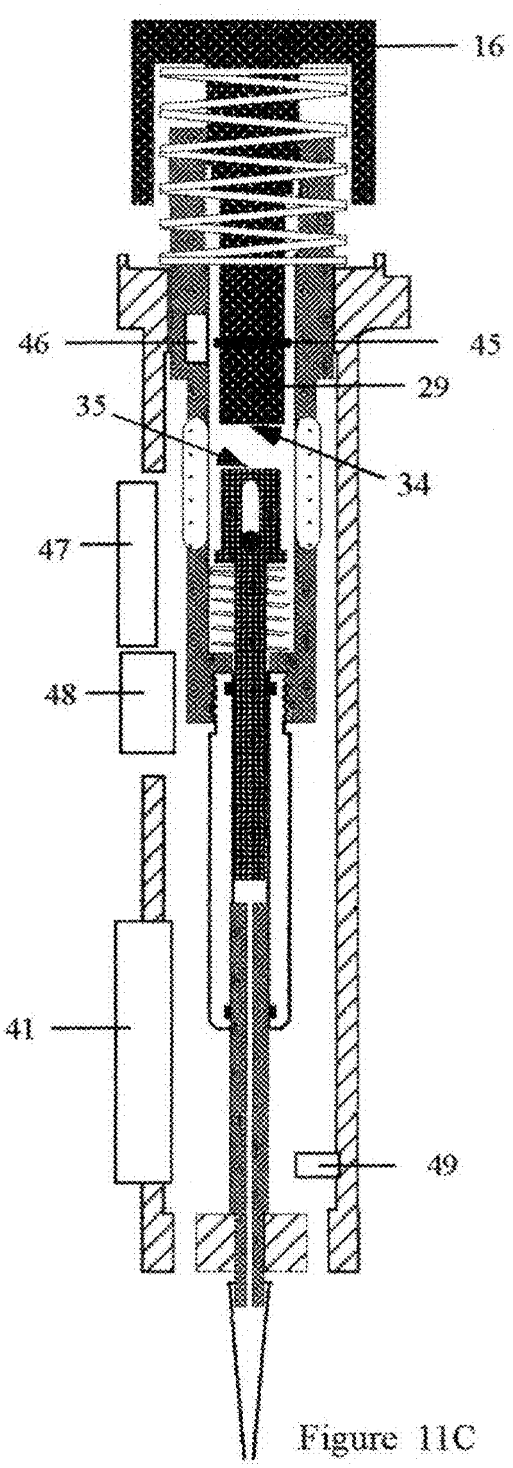
FIG. 11C shows a digital display model.

FIG. 11C shows a Digital Display feedback via a smart sensor that guides manual calibration. A small battery 48 provides power for an electronic package 47 that reads signals from a magnetic strip or optical detectors 46 that may follow the position of an encoder disk 45. The encoder disk 45 is mounted to, and rotates with, the pusher stalk 29 when the top pusher/adjustor knob 16 is turned. This keeps track of the position of the pusher stalk bottom 34 and through standard electronic monitoring techniques knows how far the pusher stalk bottom 34 has been set from the top rod top 35, and from this knows the aspiration volume that has been selected. A thermistor 49 also sends the temperature to the electronic package 47 which may be used to modify knowledge of the actual volume that would be aspirated by the set distance. The volume display 41 will in most cases be on all the time to show the actual volume that the system is set to aspirate so that the user can turn the pusher/adjustor knob 16 more or less to bring up a display that shows exactly the desired volume. Other optical detectors will also enable detection of the position of the pusher stalk bottom 34 to monitor and gently guide the operator further.

Figure 11D:
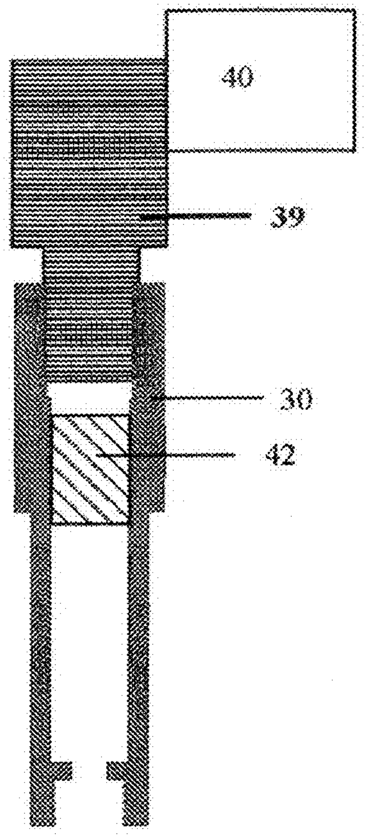
FIG. 11D shows substitution for a fully motorized and smart motorized unit.

FIG. 11D shows substitute parts to the upper portion of the FIG. 11C design that upgrade the system to a fully smart motorized unit. A motor 40 replaces the manual pusher knob 16. The bottom of the motor may thread directly into the pusher 30 or it may have an extension shaft 42. A larger intelligent display 40 is preferably located at the top. This design manages feedback from the sensors and other preprogrammed information that dynamically maintains near perfect calibration on an ongoing basis.

Figure 12A:
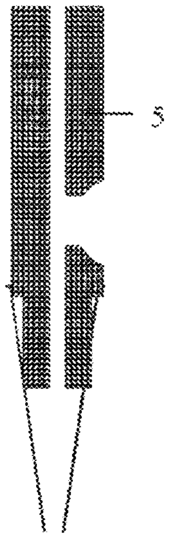
FIGS. 12A, 12B, 12C and 12D show a ball valve used in the tube to inactivate the low flow dispensing phase.
Figure 12B:
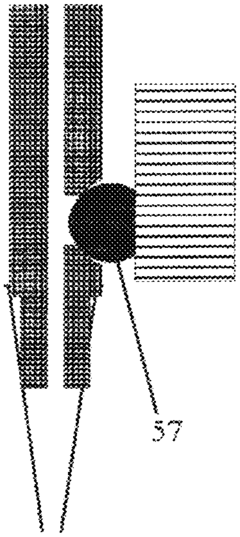
Figure 12C:
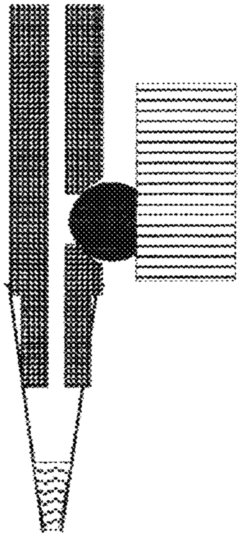
Figure 12D:
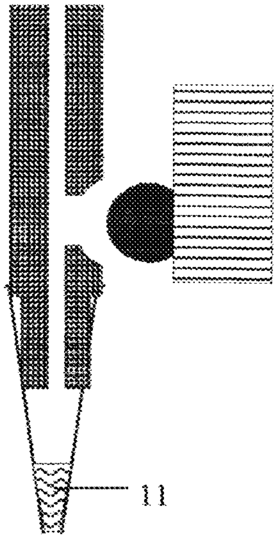

FIG. 12A is a cross section of the lower portion of the bottom tube 5 which has a small détente-shaped hole that creates a leak but can be sealed, such as by a ball seal valve 57 as in FIG. 12B or other types of seals or small valves well known in the industry. Putting the seal in place can be activated by a solenoid or manually or other standard techniques. FIG. 12C shows aspiration of a liquid sample 11 in a disposable tip when the seal is in place. FIG. 12D shows that if the seal is then removed, creating a leak above it, the sample is held in by surface tension and does not fall out. The sample might lower slightly to a small bulge at the tip but not be lost. If one pushed air down through the channel from above, under positive pressure, the air easily exits through the leak space but nothing happens below that to disturb the sample. This phenomenon creates an opportunity to use this mechanism to selectively inactivate the low flow dispensing phase of our invention so that the dispensing starts only very fast from the beginning. This is useful in certain cases, such as a very small volume (under 2 uL) of non-viscous, substantially aqueous type solution that one wants to dispense contact-free and does not want to go through an initial slow movement phase.

In the instant invention this would work as follows. A sample is aspirated as in FIG. 12C, the valve would open as in FIG. 12D and remain open while the initial offset displacement phase of dispensing proceeds, in which dispensing movement occurs down to the resistance stop. The air displaced from above exits the open valve with no significant positive pressure transmitted to the sample below. Then the valve would close back to the normal FIG. 12C position and the final descent that closes the interpiston space would proceed normally and the sample would be blown off completely cleanly and contact-free. What would otherwise have been an initial slow flow dispense phase was simply incapacitated and the high flow contact-free blowout was permitted to command the entire dispense. In this method, however, the user's thumb still has to push down through the offset displacement mode even though it is inactivated, which is wasted motion.

FIGS. 13A-13F show complete elimination of the initial low flow dispensing phase by means of a connector pin 52. As with the embodiment of FIG. 12, with certain solutions in certain applications it may be desirable to dispense the solution very fast right from the beginning and not to dispense through a slow phase first. This could include non-viscous, substantially aqueous type solutions at small volume levels, such as under 2 μL that one wants to dispense contact-free. But if one does not want the wasted thumb movement of the FIG. 12 scheme, in which the slow dispense phase was incapacitated but its movement remained, then the embodiment of FIGS. 13A-13F can be used in which a movable pusher pod connector pin 51 completely eliminates the initial slow flow Differential Offset phase and dispenses directly only by the high flow Single phase.

Figures 13A, 13B, 13C:
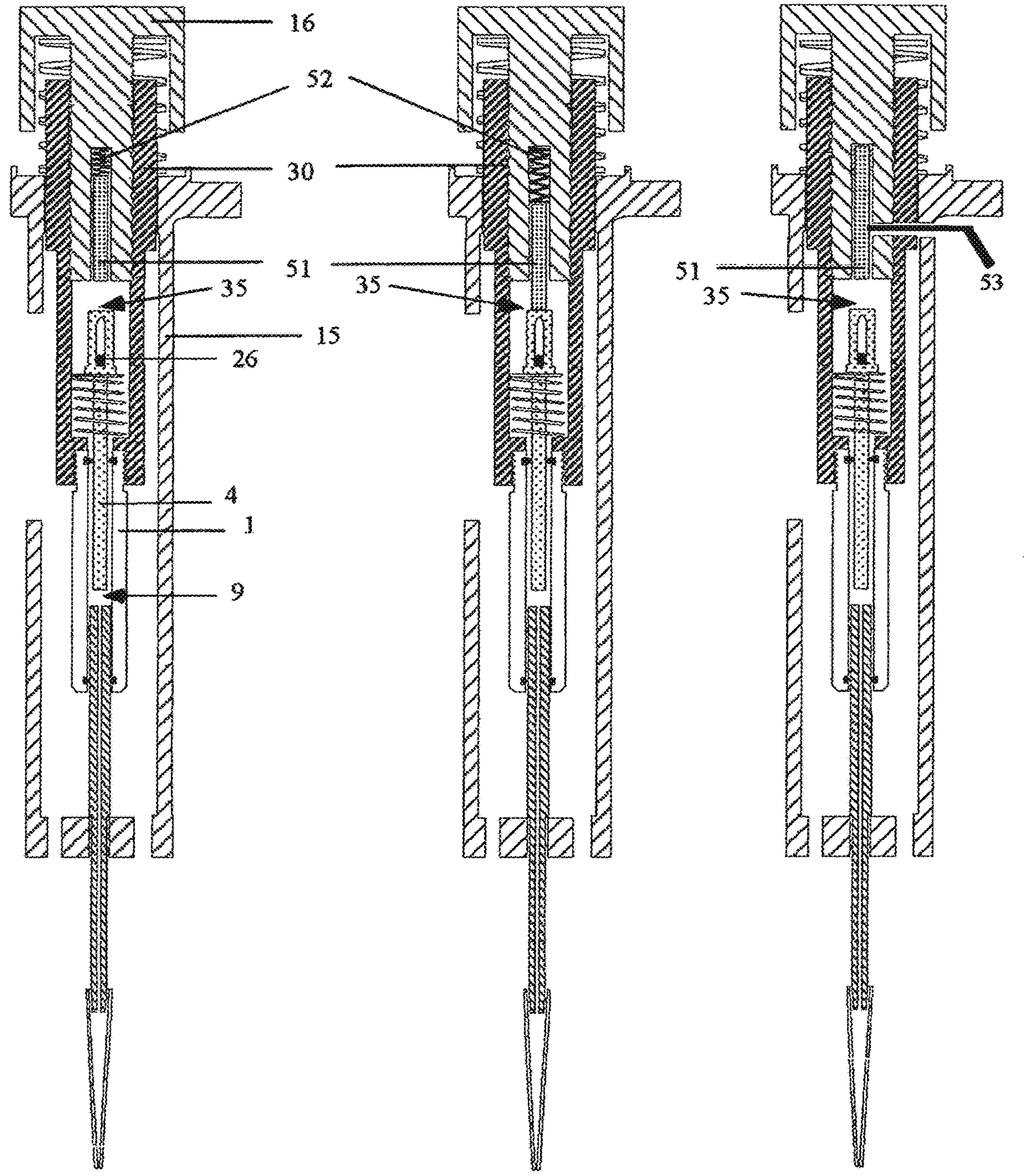
FIGS. 13A-13F show two embodiments of a connector/controller pin mechanism for eliminating low flow dispensing in the present invention.

FIGS. 13A, 13B and 13C show the connector pin 51 operating from its recessed home in the pusher body by a spring 52 and released by a release switch 53 connected to the outside of the handle. FIG. 13A shows the connector pin 51 in its normally recessed position. FIG. 13B shows the connector pin lowered to just make contact with the top rod top 35 and then to lock in place so that any subsequent movement of the assembly downward will immediately push the top rod down along with the chamber into the high flow contact-free delivery mode. FIG. 13C shows that the user can inactivate this mechanism with a simple release switch 53.

Figure 13D:
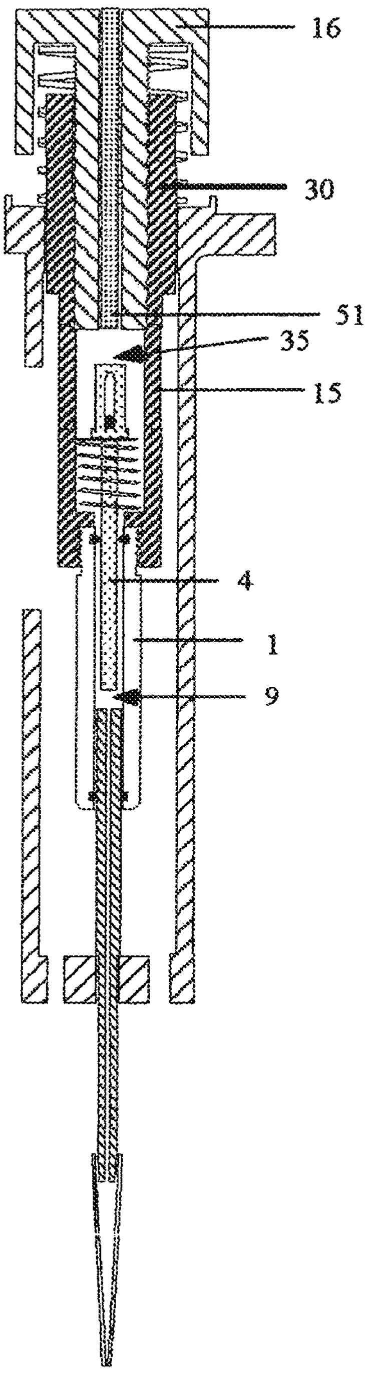
Figure 13E:
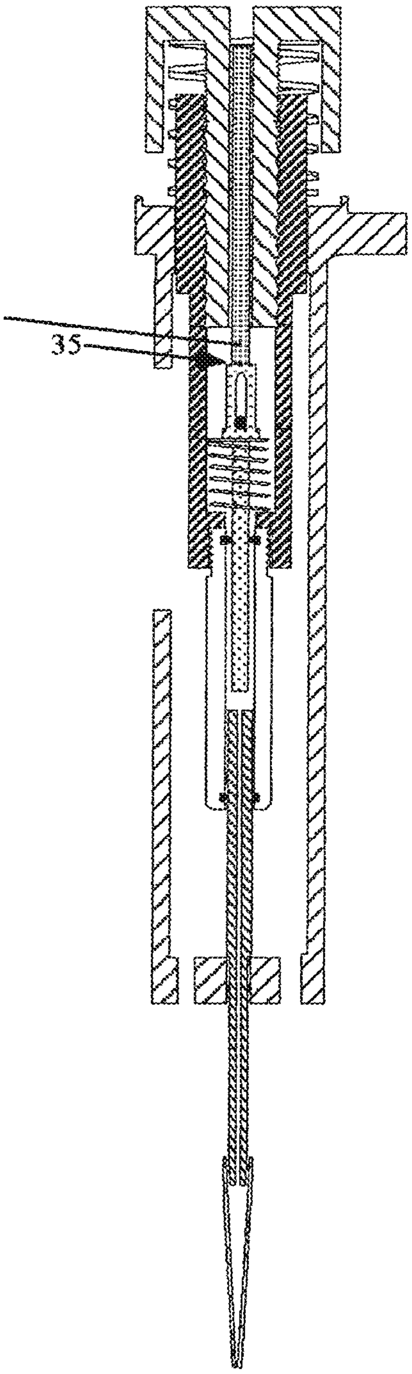
Figure 13F:
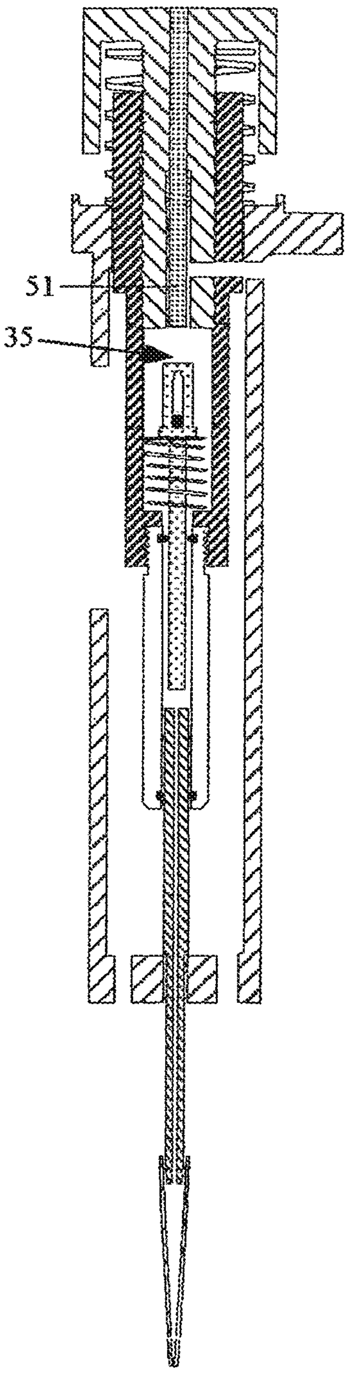

FIGS. 13D, 13E and 13F show another embodiment in which, the controller/connector pin 51 can be moved down axially right from the top of the pusher knob, by independent control (detail not shown but know to those familiar in that art) where it can be released manually and could be returned automatically directly or by a soft latched internal spring. FIG. 13D shows the connector pin 51 in its normally fully raised position. FIG. 13E shows the connector pin lowered right from the top to just make contact with the top rod top 35 and then to lock in place. FIG. 13F shows that the starting position could be restored automatically through a motor. The essential mechanism concept is that when the controller/connecter pin 51 is moved down as shown from FIG. 13A to 13B and from FIG. 13D to 13E, the very next movement of the assembly down will push directly on the top rod top 35 to cause the high flow contact-free blowout of the sample.

FIGS. 14A-14E show how the connector/controller pin operates during a complete dispensing sequence, which is controllable by many spring, manual switch, solenoid or other actuator techniques.

Figures 14A, 14B, 14C, 14D, 14E:
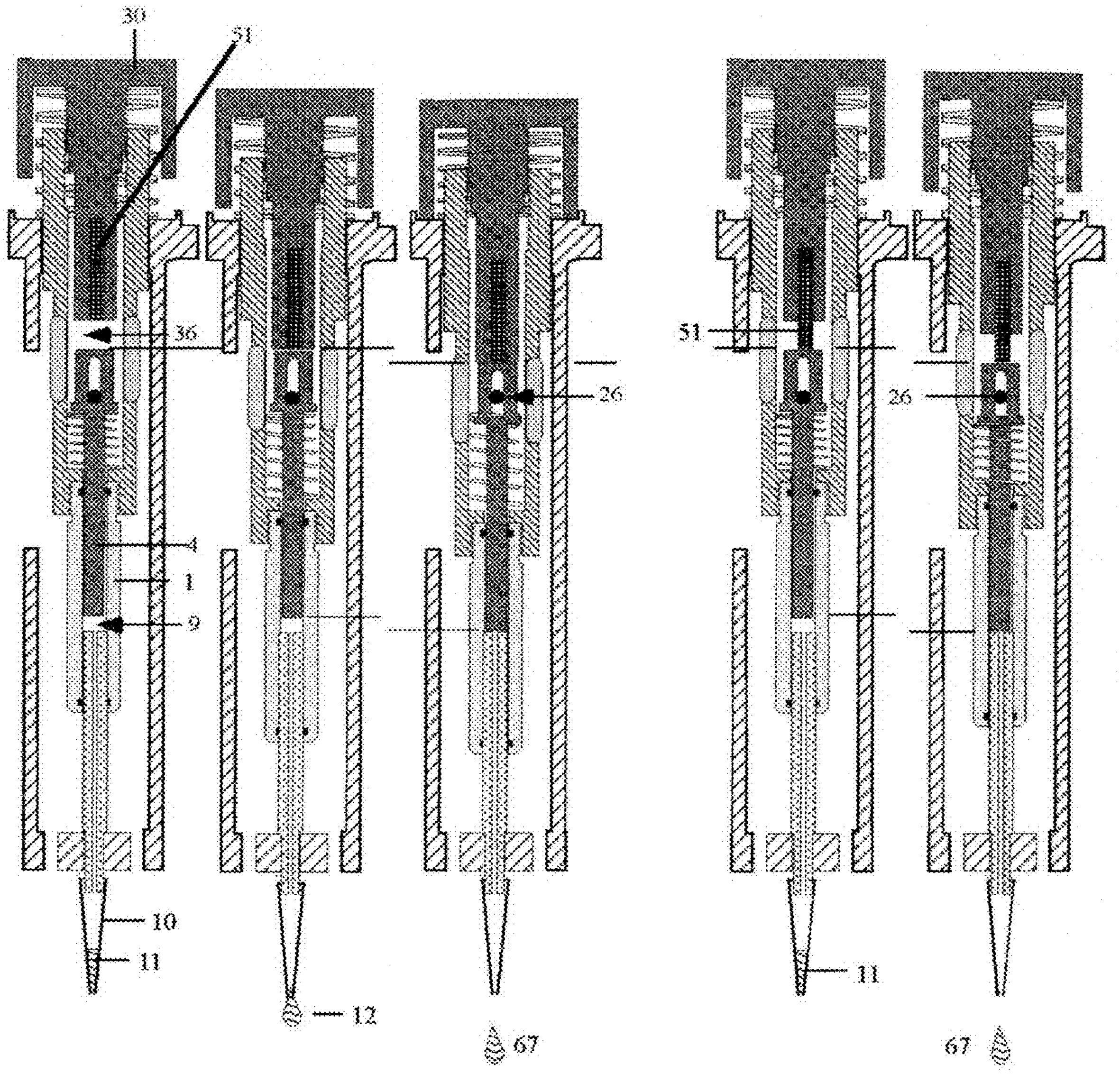
FIGS. 14A-14E show how the connector/controller pin operates during a complete dispensing sequence to eliminate initial slow flow.

FIGS. 14A-14C show normal dispensing without using the connector pin.

FIG. 14A shows a starting position after a sample 11 has been aspirated in a disposable tip 10 in which the connector pin 51 is in its usual inactive recessed position inside the pusher body 30, with the interpiston air gap 9 in its usual full open position and the aspiration distance 36 set for a desired volume. In FIG. 14B the pusher stalk has moved down to contact the top of the top rod 4, and the two seals in the cylinder 1 that moved down with it swept the two pistons to give fine low flow offset displacement dispensing which, if one paused, would end with the typical hanging drop 12. FIG. 14C is after pushing the top rod 4 down beyond the stop to close the interpiston air space 9, showing the cross pin 26 now near the middle of the top rod slot, producing the high flow of the single mode that gives the completely contact-free 67 delivery of the sample. The connector pin 51 has remained recessed and inactive throughout the FIG. 14A-14C dispensing cycle.

FIGS. 14D and 14E show how the connecting pin 51 can be activated to eliminate the slow dispense mode. FIG. 14D shows a starting position in which the sample has been aspirated (as in FIG. 14A) but in which the connecting pin 51 has been released from the pusher stalk so that it contacts the top of the top rod, into which position it is locked. The very next movement downward, shown in FIG. 14E, therefore immediately must push directly down on the top rod to lower it to the bottom to close the air gap 9 for the high flow, contact-free dispensing 67.

Figure 15A:
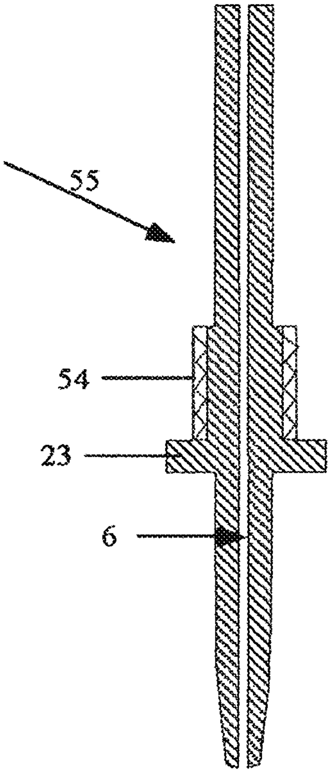
FIGS. 15A-15F show an interchangeable combined tube/mandrel that varies air space at both ends.
Figure 15B:
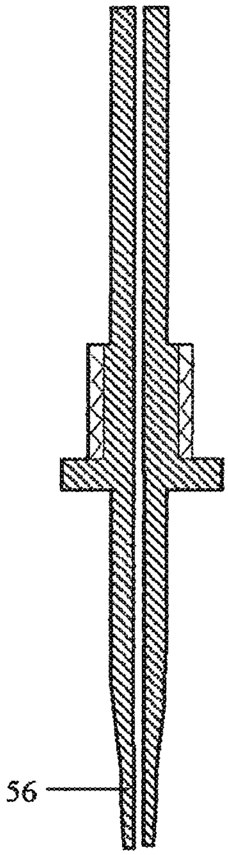
Figure 15C:
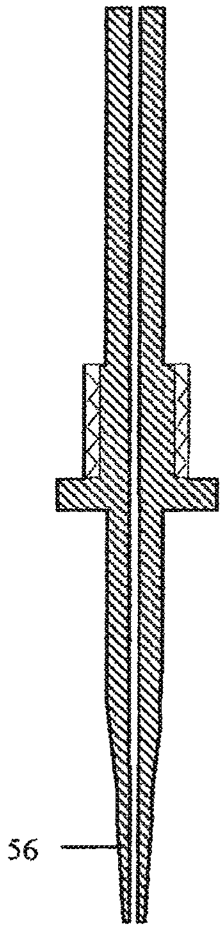

FIGS. 15A-15E show an interchangeable combined bottom tube/mandrel 55 that can control air space in the instant invention at both ends. 15A is a cross section of an embodiment of a tube with a channel 6 throughout that may have a flange or knob 23 which demarcates an upper portion above the flange that is like the bottom tube of the instant invention and a bottom portion below the flange that is like the mandrel of the instant invention. When the bottom portion extends further down it is considered a mandrel extension filler 56. In FIG. 15A the upper and lower portions extend least, FIG. 15C shows them extending most and FIG. 15B is intermediary. The knob or flange 23 may have a thread 54.

Figures 15D, 15E, 15F:
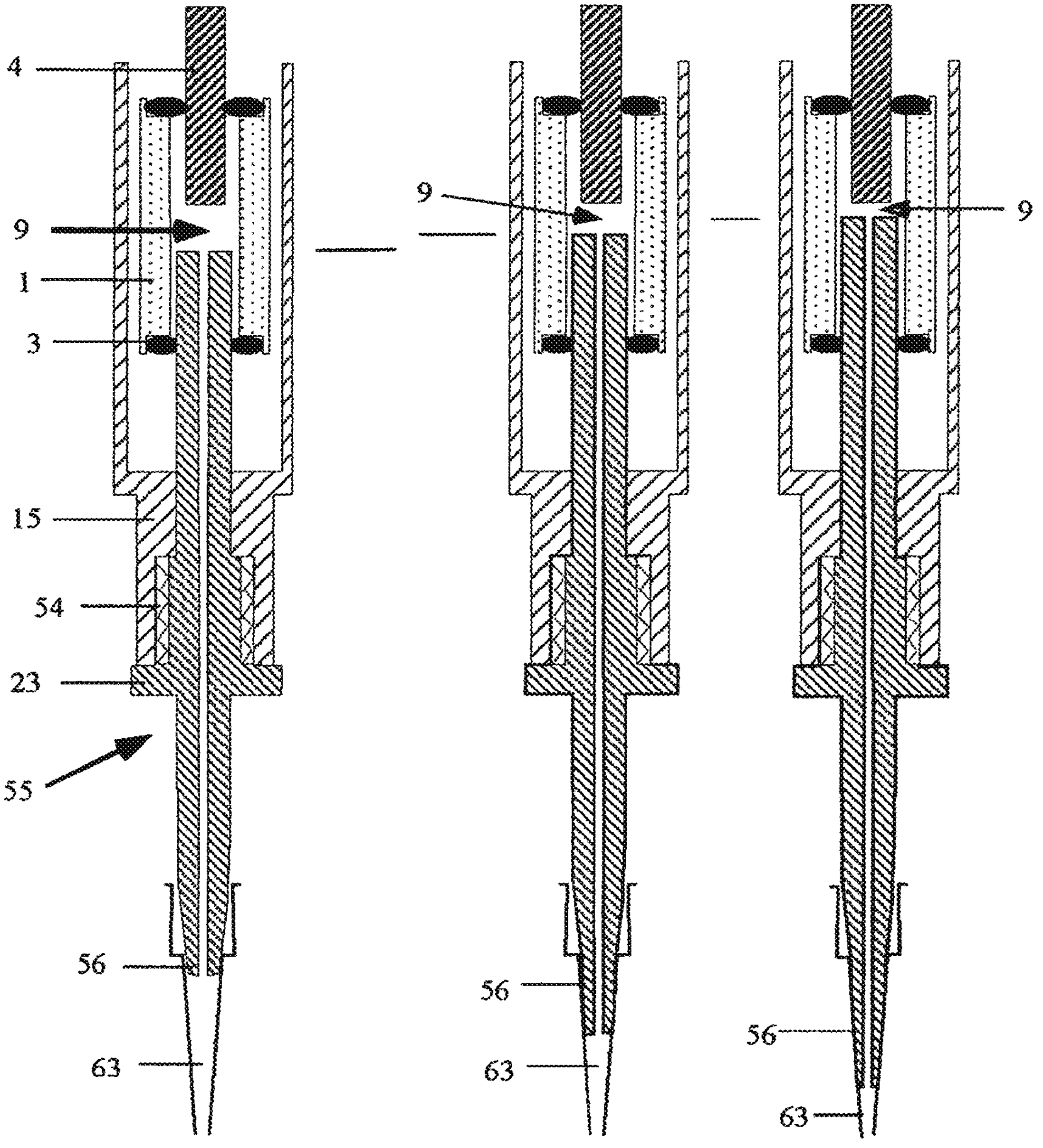

FIGS. 15D, 15E and 15F show how this works in the pipettor.

FIG. 15D uses the shortest tube/mandrel 55 shown in FIG. 15A. The tube/mandrel has been installed in the pipettor frame/sleeve 15, most likely by inserting it up through the bottom of the frame/sleeve and turning the knob 23 so that its threads 54 tightly engage the bottom inner threaded portion of the frame/sleeve 15. The upper portion, bottom tube surrogate portion has been inserted past the bottom seal 3 into the cylinder 1, where it operates as the bottom tube with respect to the top rod 4 in the manner described throughout for the instant invention. The shorter of the tube/mandrels used in FIG. 15D means that the tube end extends up least so the air gap 9 is largest, and at the other end there is minimal or no extension filler 56 in the disposable tip so the available tip space is also largest. The system may therefore be used for the largest volume range applications, like up to 20 microliters, because the tip has the clear space to pick up the larger volume, and the larger air gap permits blowing it all out.

FIG. 15E uses the longer tube/mandrel shown in FIG. 15C. This is optimally used for the tiniest volume applications, like down to 20-200 nanoliters, because the tube end extends up higher to minimize size of the air gap 9, because much less air is needed to blow the tiny volumes out. At the same time, the longer mandrel extension filler 56 fills more of the dead space in the disposable tip and minimizes the tip space 63. FIG. 15B shows an intermediate situation.

The combined tube/mandrel can be used to minimize air dead space at both ends simultaneously by reducing both the resting air interpiston space 9 inside the pipettor and the dead space in certain tips. This is usually not necessary in the instant invention because of the extreme stability of the design. However, as increasingly smaller nanoliter volumes will be used, such as down to 10 nanoliters, the combined tube/mandrel capability described may enhance precision and accuracy even further. The single piece design also simplifies manufacturing and optimizes fluidic integrity.

Figure 16A:
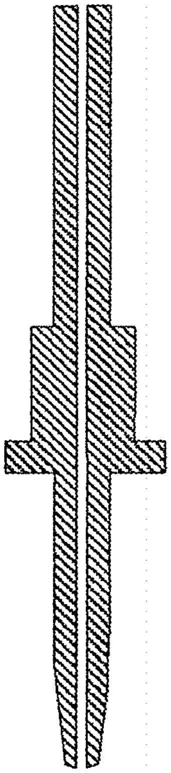
FIGS. 16A, 16B and 16C show separate small mandrel extensions to reduce tip dead space.
Figure 16B:
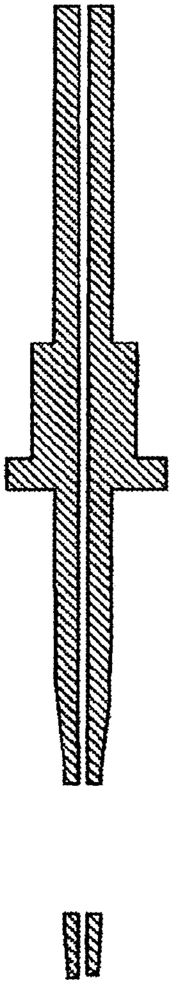
Figure 16C:
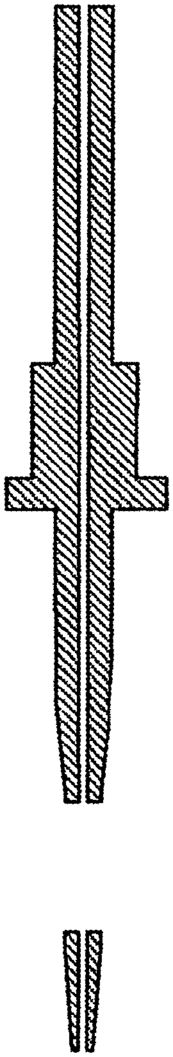

FIGS. 16A, 16B and 16C show separate small mandrel extensions that can be attached to the end of the mandrel to reduce the dead space in certain tips to further maximize precision and accuracy for the tiniest of samples. FIG. 16A is a shorter mandrel or tube/mandrel like that shown in FIG. 15A. A separate small mandrel extension like that in FIG. 16B could be attached to the bottom to provide the extension space filler distance shown in FIG. 15B. Or a longer extension like that shown in FIG. 16C could be attached to mimic the unit shown in FIG. 15C. Such separate small mandrel extensions can be attached to the end of the mandrel by reciprocal fine threading or other standard attachment methods. The purpose would be to reduce the dead space in certain tips to further maximize precision and accuracy for the tiniest of samples, such as in the 10 nanoliter range, if this is necessary. The same effect could of course be accomplished by using a combined tube/mandrel as described in FIGS. 15A-15F whose mandrel extension downward was modified in a customized way. However, in a multi-channel application of the instant invention, such as for 96 or 384 channels, separate small mandrel extensions might more conveniently be placed on tips only in certain selected rows or columns for special applications.

Figures 17A, 17B, 17C, 17D:
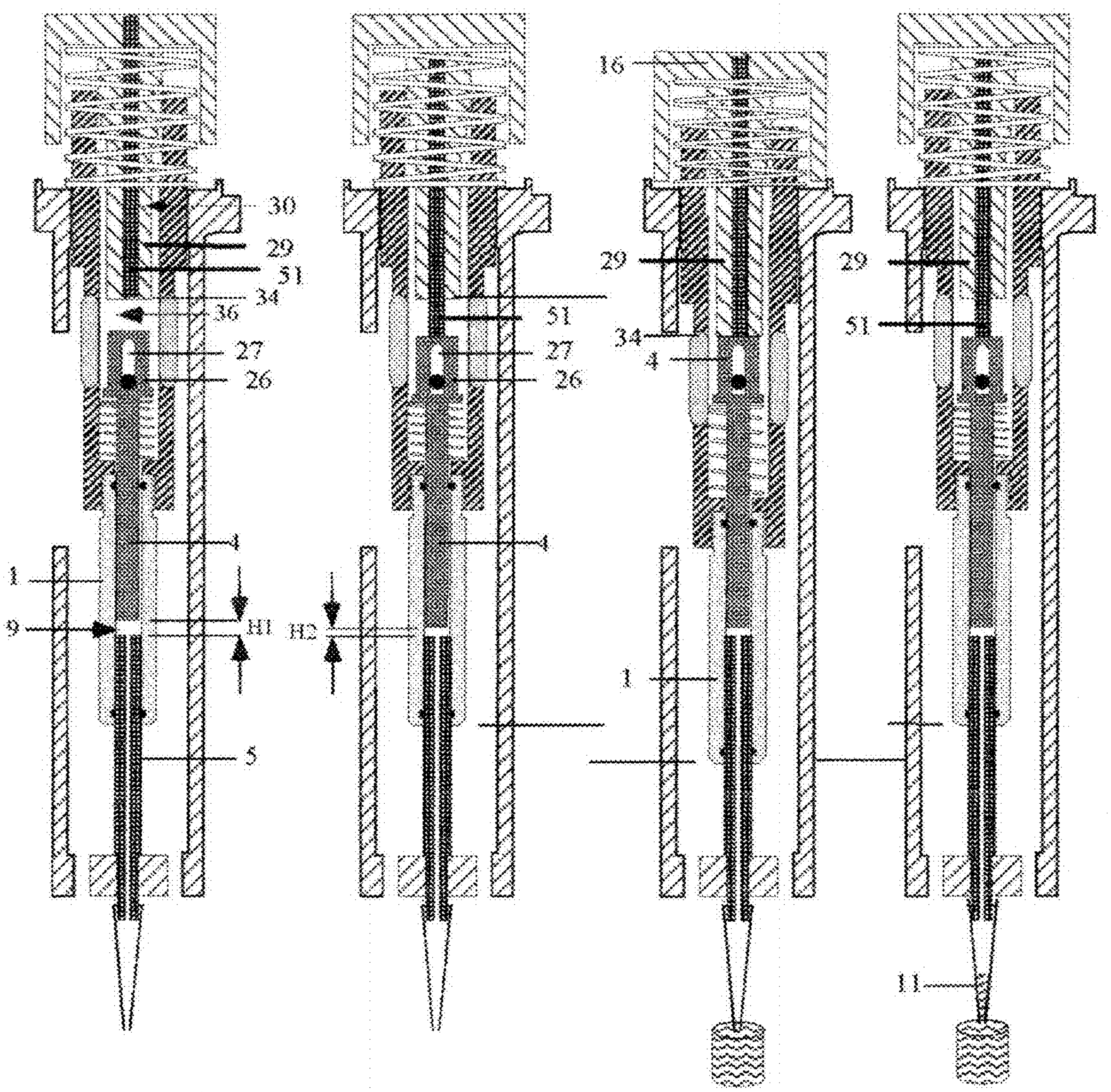
FIGS. 17A, 17B, 17C and 17D show minimization of interpiston space by a connector controller pin.

FIGS. 17A, 17B, 17C and 17D show how the connector/controller pin can operate to reduce the interpiston air space to the minimum needed to permit contact-free blowout delivery for the volume being used. FIG. 17A shows a starting point with typical aspiration distance 36 yet to traverse and an interpiston air gap 9 distance of H1 which might be 0.100 inches, which space would be needed to blow off contact-free a 20 μL sample, for example. But if one only wanted to pipette a 5 μL sample, for example, then FIG. 17B shows that the connector pin 51 comes down, independently and leaving the pusher stalk 29 behind, to push the top rod down below its usual resting height and to hold it there, overcoming the usual function of the cross pin 26, thereby reducing the interpiston space 9 to about half to an H2 distance of approximately 0.050 inches. That allows ample space and volume to blow the smaller sample off. This is also reflected in the fact that one can now see in FIG. 17B that the cross pin 26 is higher up in the rod slot 27. In FIG. 17C, the pusher knob 16 is pushed down, and with it the pusher stalk 29 moves down around the fixed connector pin 51 so that the pusher stalk bottom 34 is flush with the top of the top rod 4. The chamber 1 and its seals also moved down, establishing the new level at which aspiration will start. In FIG. 17D a thumb releases the pusher knob 16 so the pusher assembly and pusher stalk 29 and cylinder 1 rise—independent of the trusty connecter pin 51 which stays where it was—and aspiration of the sample 11 then proceeds in the usual fashion—but from the reduced starting interpiston space H2. One might get a small but nevertheless significantly more precise and accurate pipetting from this because of the lesser starting dead space. If one wanted to pipette only 0.5 μL then one might set the interpiston space 112 to just 0.020 inches.

Figures 18A, 18B, 18C, 18D:
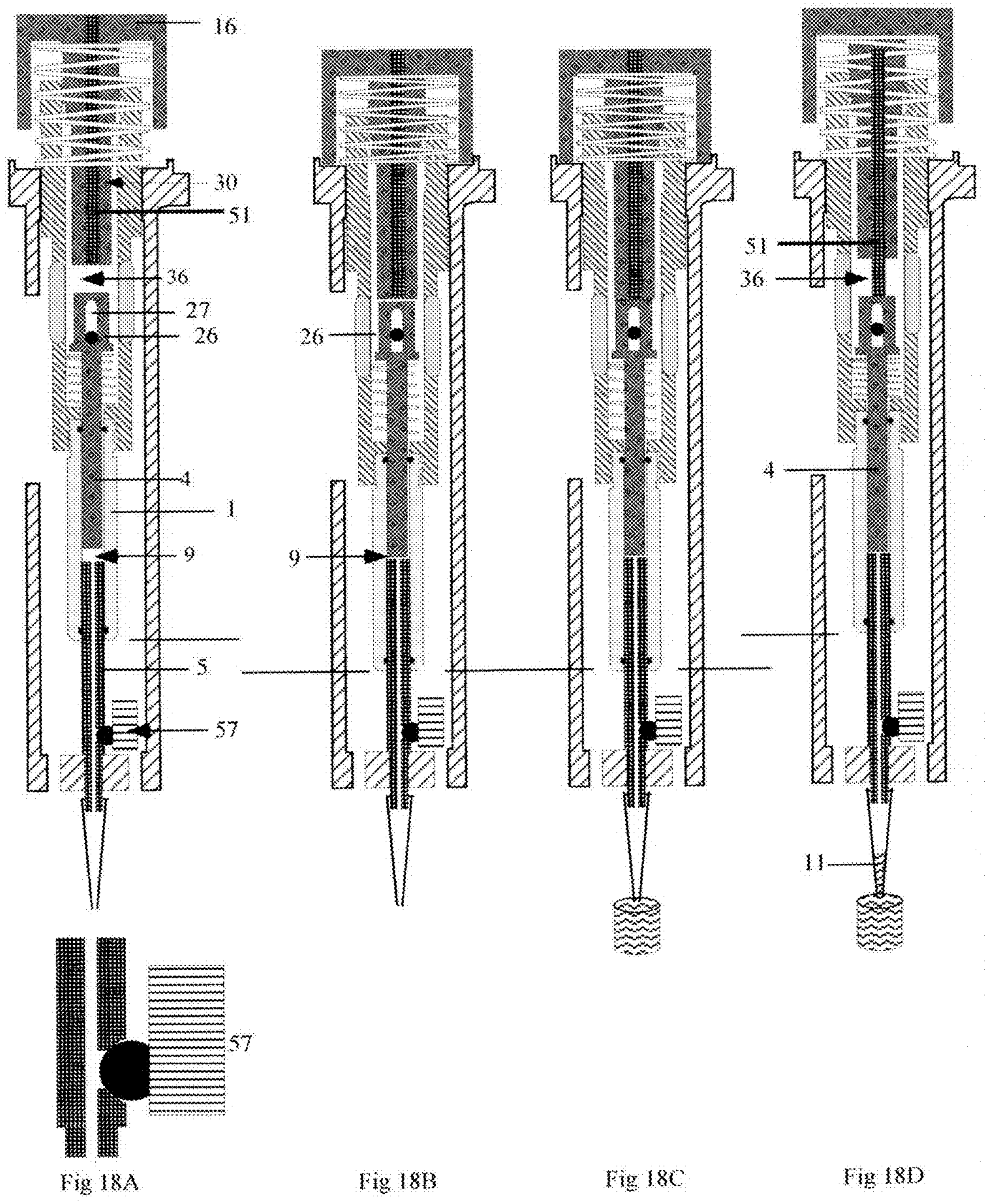
FIGS. 18A-18H depict a small valve and connector/controller pin to eliminate interpiston space before sample aspiration and then restore it for contact-free dispensing delivery.

FIGS. 18A through 18G depict an embodiment to completely eliminate any interpiston air gap prior to aspirating any volume, and then, with the help of a small valve, to restore the air gap needed to do contact-free delivery. The complete closure of the Inter-piston space 36 before aspiration starts reduces small variance in precision and accuracy that can sometimes result from that extra air volume. Then, after aspiration, a small valve in the bottom of the tube is opened to allow restoration of the interpiston space to allow dispensing to proceed in the usual manner. This embodiment uses the valve explained in FIG. 12 in conjunction with an independently operated connector pin 51, as previously described for the methods shown in the FIG. 14 and FIG. 17 series FIGS. 18A-18D show how this operates during aspiration. FIG. 18A shows a resting home position in which the connector/controller pin 51 is recessed out of the way in the pusher 30, a small bleed hole in the bottom tube is sealed by the valve 57, and the interpiston air gap 9 and aspiration distance 36 are their full typical size. FIG. 18B shows that a thumb has pushed the top knob 16 down, lowering both the pusher body 30 stalk and the connector pin 51 contained within it together, and bringing the cylinder 1 down with them, to traverse the intended aspiration distance 36 to the resistance stop, but then having continued to push down lower beyond the resistance stop, pushing the top rod with them, until the interpiston space 9 is also eliminated. This is also evident by the fact that the cross pin 26 now shows near the middle of the top rod slot 27. This is a new and uncommonly low position to start aspiration. FIG. 18C shows that with everything in this position the tip is then put into a sample source in anticipation of aspirating. FIG. 18D shows that a thumb has released the top knob 16 and the whole pusher 30 and cylinder 1 assembly have been released back up to do the fine offset differential aspiration of the sample 11—made possible because the connector/controller rod 51 is operating independently and remains locked at its lower position to prevent the top rod from rising. The sample 11 has been aspirated in the fine resolution differential offset mode by the sweep of the two seals over the immobile bottom tube and top rod, but given the additional high precision and accuracy advantage of having the aspiration done with substantially no interpiston space 9. FIG. 18D shows that the full starting aspiration distance space 36 is now restored because the independently operating connector/controller pin 51 keeps holding the top rod 4 down, but there is no interpiston space 9 left for any clean high flow dispensing of the sample 11.

Figure 18E:
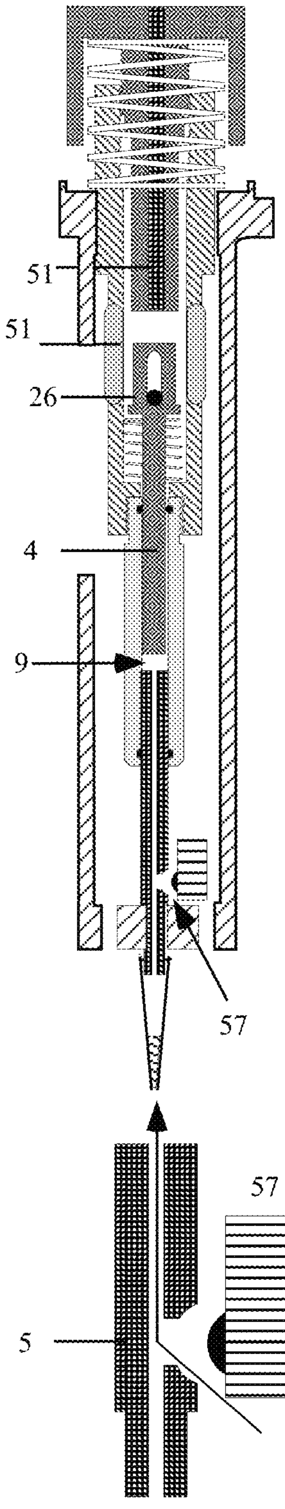

FIGS. 18E-18H show how this operates for dispensing. FIG. 18E shows that the bottom tube valve 57 opens and the connector pin 51 withdraws upward to allow the top rod 4 to rise to its normal location, bringing the bottom of the top rod slot 27 flush with the cross pin 26. The connector pin 51 will remain withdrawn into the pusher and will move only with the pusher for the dispensing that follow and exert no independent action. The top rod rise creates a suction and the valve opening creates the path that lets that suction draw air in from the outside to restore the usual interpiston space 9. Pulling this air in does not disturb the sample that was aspirated in the tip because the resistance to the air coming in and moving up into the interpiston space 9 is so tiny by comparison with the stiction or friction between the sample and inside of the tip that holds the sample up. The incoming air naturally takes the path of least resistance, as shown in the enlarged closeup of the valve 57 and air path at the bottom of FIG. 18E, and travels up in this case without disturbing the sample 11 in the tip. One can even typically remove such a tip and the liquid will still hang in there, though this is not always true for certain alcohols or very hydrophobic liquids, in which case the sample in the tip may be drawn up slightly, but such drawing up does not in any way interfere with the contact-free dispense of the sample to follow.

Figure 18F:
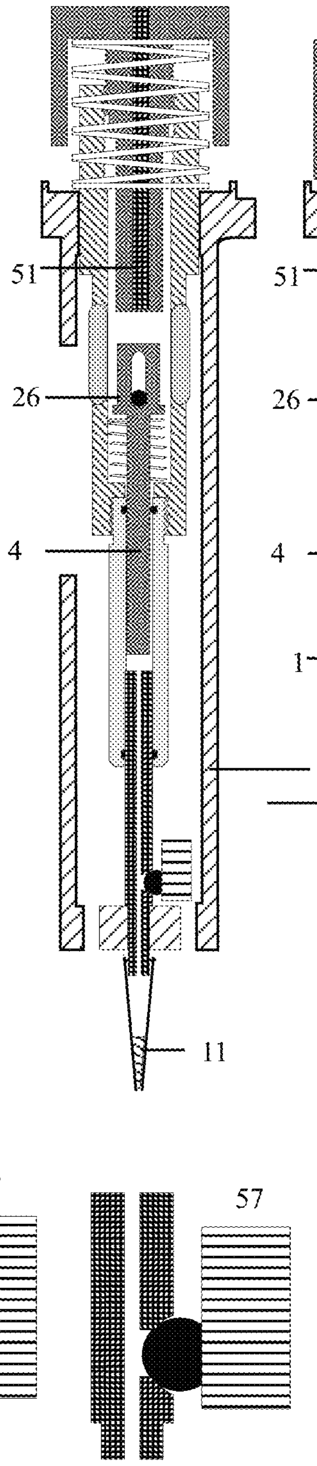
Figure 18G:
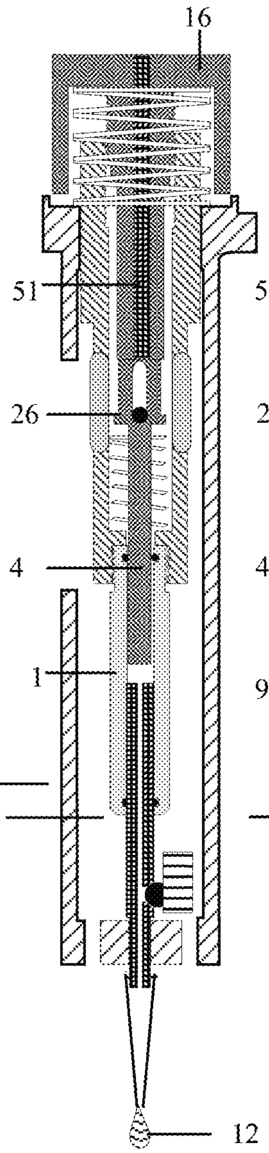
Figure 18H:
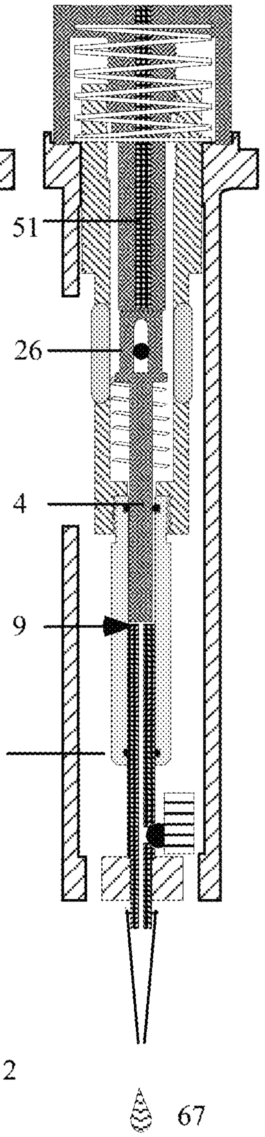

In FIG. 18F the valve has closed and the sample 11 remains substantially unmoved, although if it did move up or down slightly that would have no effect on it subsequent complete delivery. The valve will remain closed for the dispensing that now follows. Everything is now in the normal position for dispensing. FIG. 18G shows that the top knob 16 has been pushed down, and with it the chamber 1 and mechanisms that do the slow flow fine offset displacement dispensing that typically produces a hanging drop 12. In FIG. 18G the final movement down occurs which eliminates the interpiston space 9 to delivers the high flow clean contact-free blowout of the final sample 67.

Figures 19A, 19B, 19C:
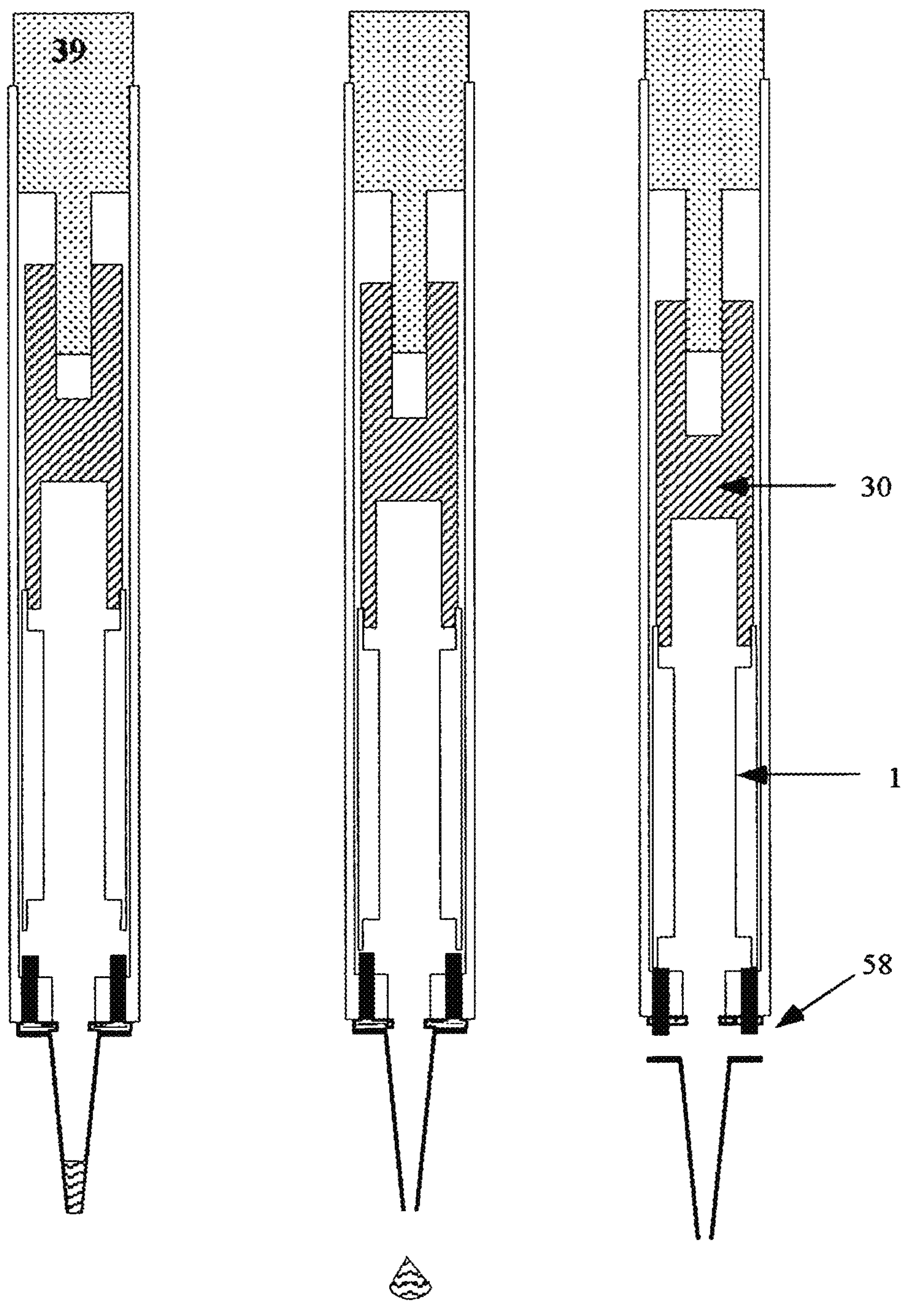
FIGS. 19A, 19B and 19C show an alternative form of internal tip stripper

FIGS. 19A, 19B and 19C depict an internal tip stripper that is particularly suited for motor actuation in a motorized pipettor or automated application, but that may also be used in manual handheld units by any one of a number of internal mechanical couplings known to those expert in the art. Most conventional pipettors have a tip stripper that is external to the main pipetting unit. FIG. 19A shows a motor 39. After dispensing the sample in FIG. 19B, the bottom of the very cylinder 1 that moved down close to the bottom, or a downward extension thereof, is used to push down further to engage spring-loaded pins 58 which push down on a circular ejector plate just above the tip engagement level on the mandrel (detail not shown) to eject the tip. This makes for an extremely compact unit since the tip stripping mechanism is kept within the narrow confines of the element.

FIGS. 20A-20H depict repetitive dispensing with a unit with a motor, according to various embodiments of the invention, in which a larger liquid volume that has been aspirated is dispensed by consecutive movements of the cylinder 1 downward.

Figures 20A, 20B, 20C, 20D:
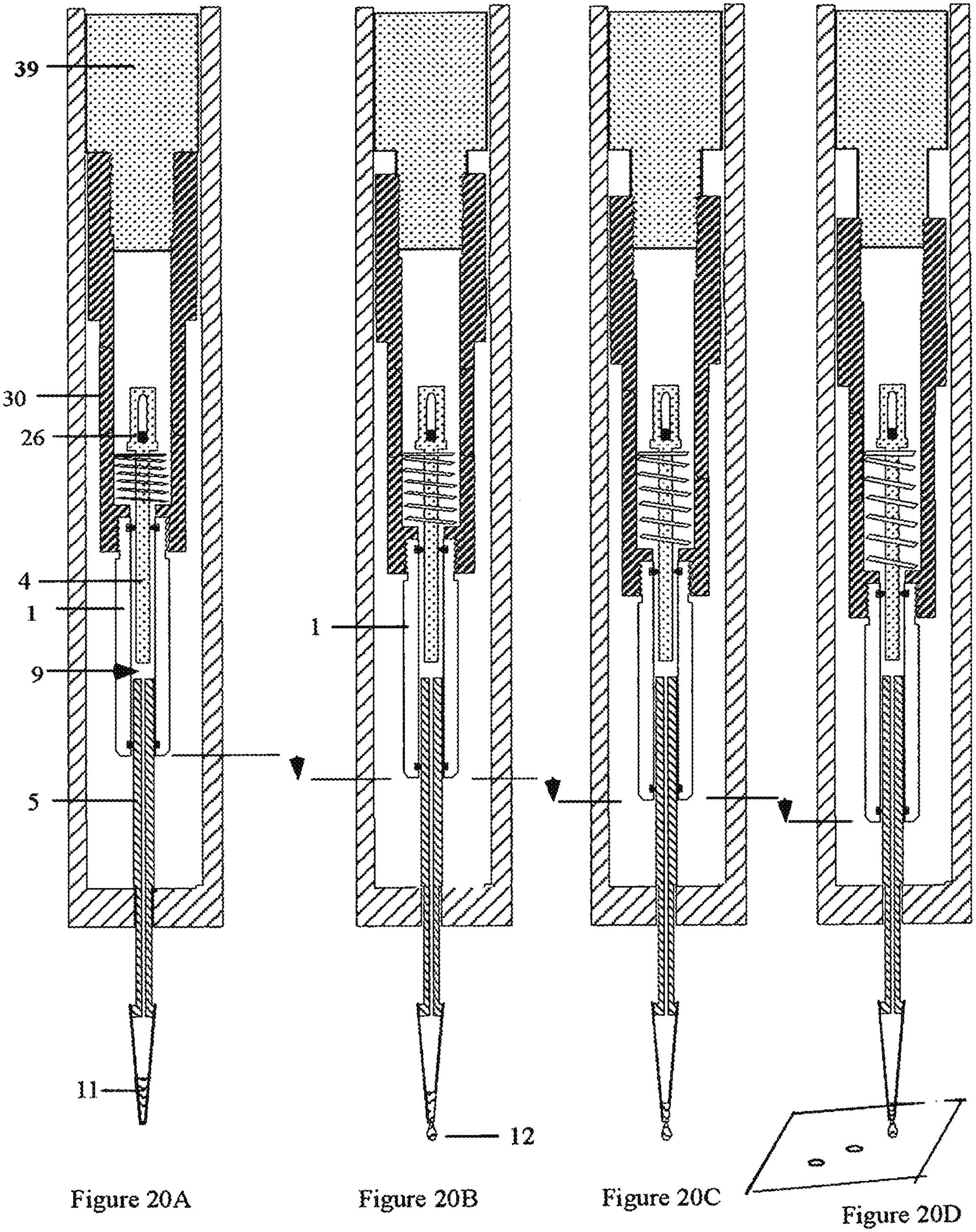
FIGS. 20A-20H show repetitive dispensing with the motorized unit.

FIGS. 20A-20D show such repetitive dispensing of sub-microliter drops by offset displacement in the slow flow mode (with resolution as fine as a 10 μL syringe, for example). FIG. 20A shows a motor 39 starting situation in which sample 11 has been aspirated into the tip. FIG. 20B shows that the cylinder 1 has moved down in this slow offset displacement mode and a precisely extruded minute drop 12 bulges from the bottom of the tip and can be delivered by touching it off to a surface, like a slide depicted at the bottom of FIG. 20D. The cylinder 1 moved down over a range in which the top rod 4 does not move and the greater diameter of the fixed bottom tube 5 is therefore offset by the slightly lesser diameter of the top rod to give extremely fine resolution. The resting air gap between the rod and tube 9 does not change. For sub-microliter volumes, the drop will typically be let to extrude, similar to a hanging drop, and touched-off each time to a surface such as a slide for delivery. This is done progressively in FIGS. 20C and 20D, reducing the volume of sample left in the tip each time until it is used up in FIG. 20D. These small drops may be 250 nanoliters in size, for example. The bottom of FIG. 20D indicates how they may have been touched off onto a slide, for example. If the pipettor of the instant invention uses the tapered top rod and methodology described in FIGS. 5A.1-5B.4, then resolution is precise down to the 10-50 nanoliter range.

Figures 20E, 20F, 20G, 20H:
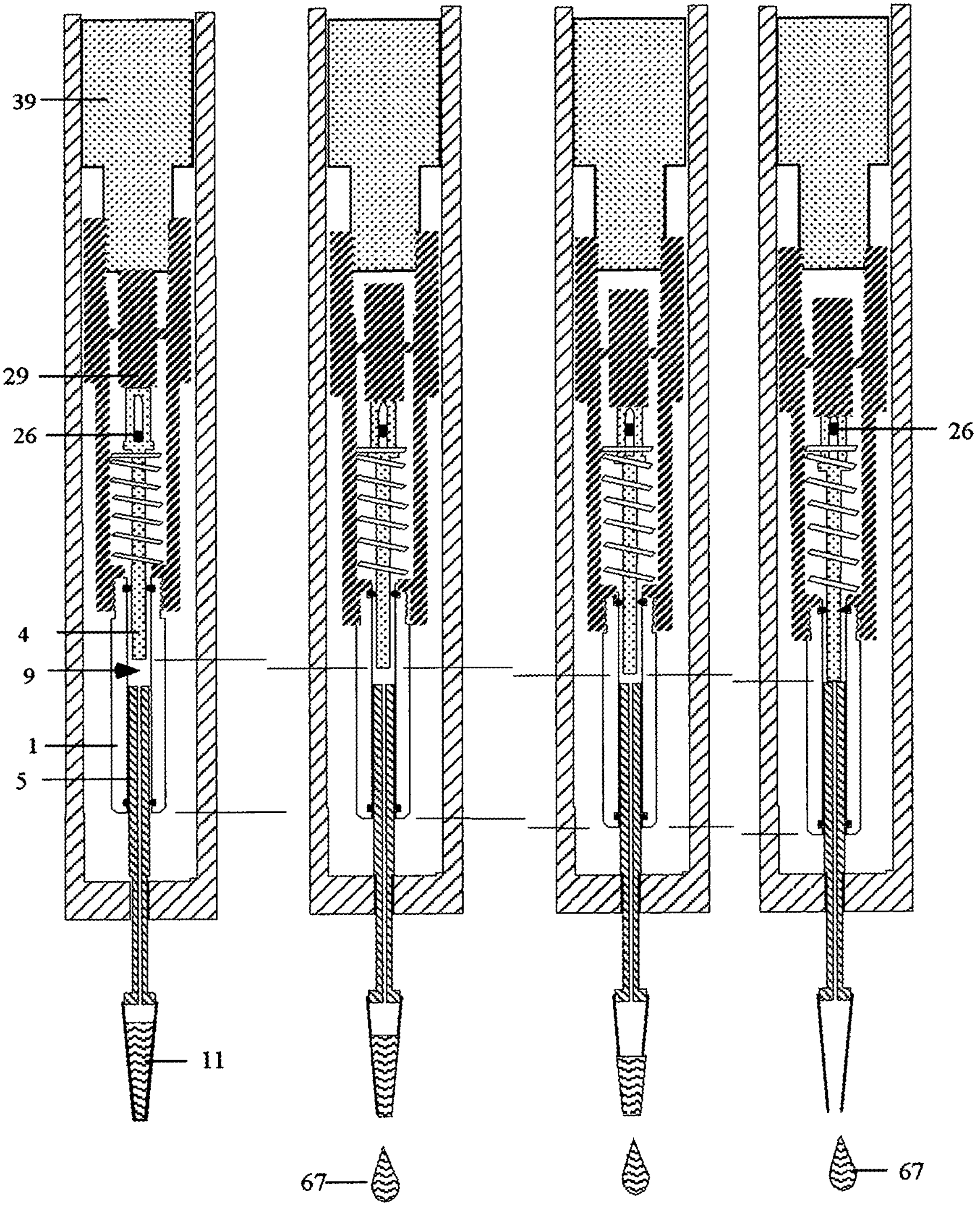

FIGS. 20E-20H show repetitive dispensing of microliter sized drops by non-offset displacement, shearing the sample off completely contact-free. In FIG. 20E the pusher stalk 29 has reached the top of the rod 4, below which the rod moves down with the cylinder 1 and the air gap 9 is closed progressively solely by the bottom tube, without any offset from the slightly thinner top rod. The resultant very fast, crisp air flow therefore impacts the sample in the tip and it shears off contact-free. FIGS. 20F and 20G show the air gap 9 progressively closing as the sample remaining in the tips progressively reduces until the sample is gone in FIG. 20H. Drops down to 1 μL are typically deliverable by contact-free jetoff this way, with precision typically around 2-% Coefficient of Variation.

Figure 21A:
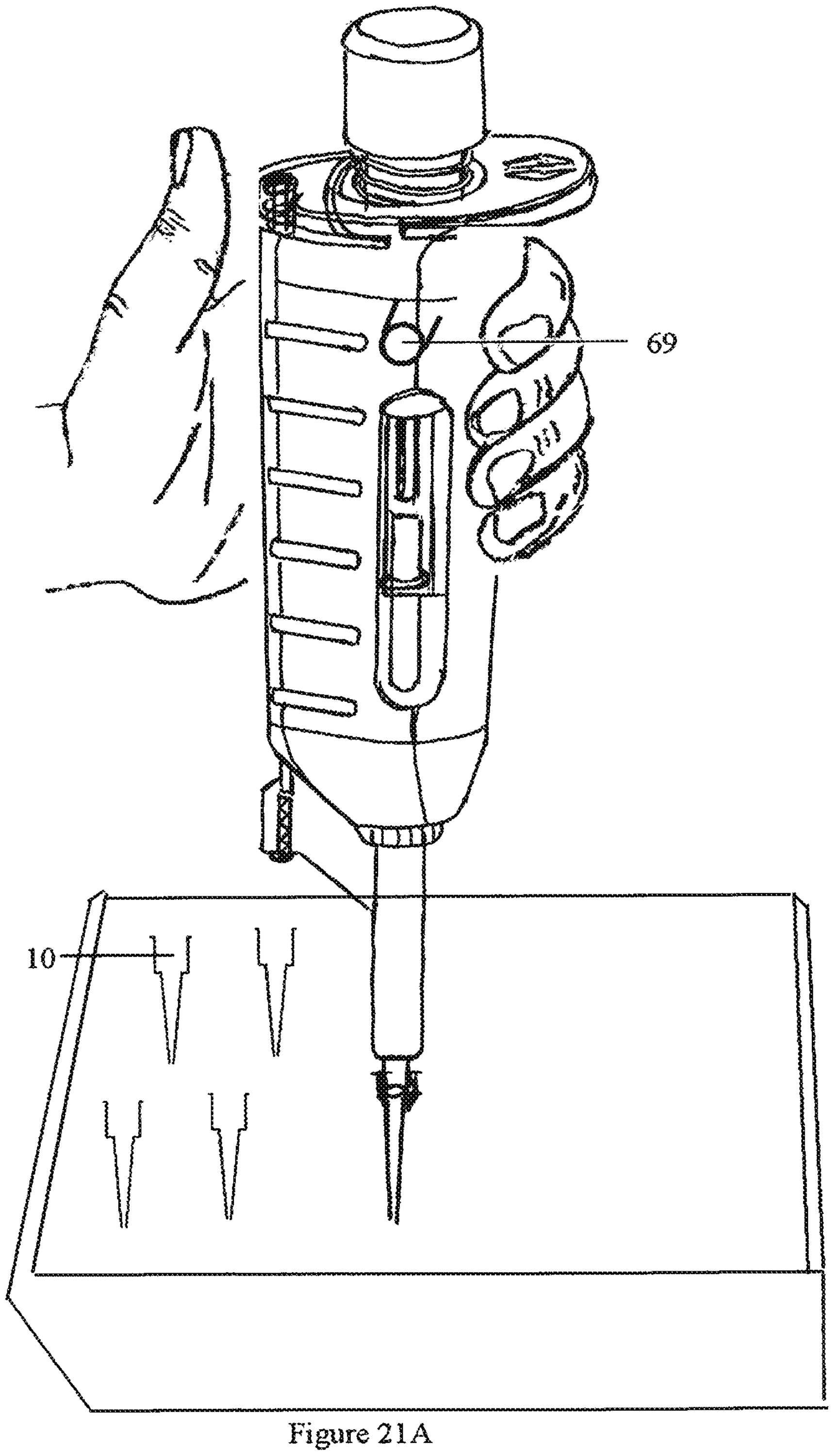
FIGS. 21A, 21B and 21C reflect storing energy during tip taking for improved aim.
Figure 21B:
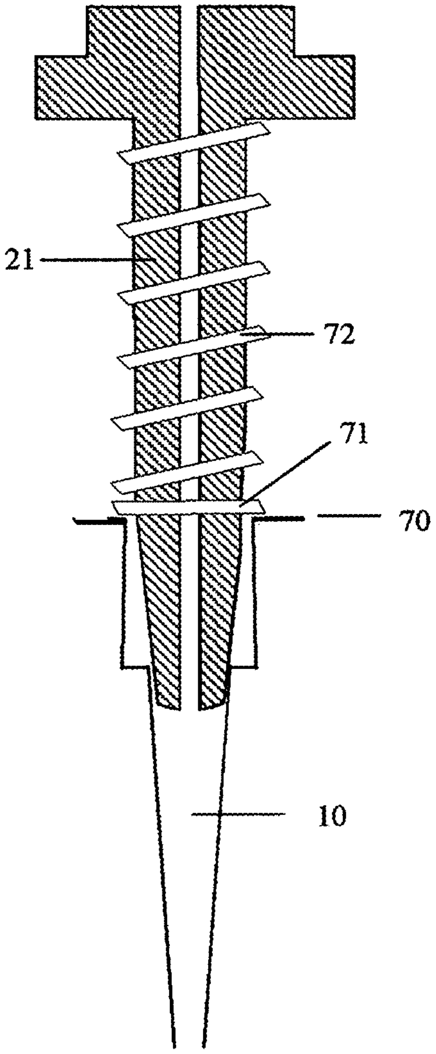
Figure 21C:
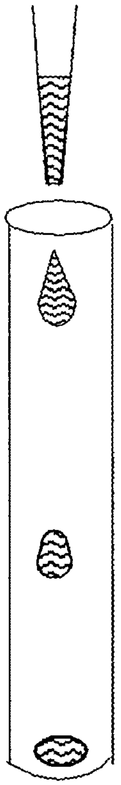

FIGS. 21A, 21B, 21C and 21D show how the normal act of taking a disposable tip can be harnessed to store energy for an enhanced aim contact-free dispense down through a long thin plastic tube to the bottom without the sample catching the sides. FIG. 21A depicts taking a disposable tip 10 from a tip box with the instant invention in the same way that almost everyone doing conventional pipetting does—by pressing down in a motion a little like using a hammer which naturally produces a great deal of force quite easily. The force is usually far greater than required to firmly seat a tip and the extra energy and force exerted is wasted. FIG. 21A also shows a soft energy release switch 69 that will be discussed further. FIG. 21B is a cross section enlargement showing the mandrel 21 inside a disposable tip 10 that has a tip flange 70 rim that can be caught by a tip flange catcher 71 on the mandrel. By a design whose detail is not shown, and which can be done in many ways commonly known in the art, the hand movement downward that catches the tip flange 70, before the mandrel lowers enough to fully engage the inside of the tip to pick it up, may compress a mandrel spring or other kind of energy catcher 22 to store energy. This mechanism, whatever its embodiment detail may be, will occur automatically each time the pipettor mandrel is inserted into a tip to pick it up. The compressed spring or other mechanism stores energy that can be used for contact-free dispensing by pressing the soft energy release switch 69. FIG. 21C shows a contact-free dispense of a small sample that is shot down the length of a long standard plastic laboratory tube with sufficient force, and aimed sufficiently straight, that it gets to the bottom without being pulled to the side and getting stuck on the tube wall by electrostatic forces that are common. This capability is due to two factors. One factor is the contact-free high velocity delivery force with which the instant invention can deliver small samples, as discussed throughout this patent application. But the second factor is the use of a very soft switch to use the stored energy to activate the high flow, contact-free dispense. Normally, the user activates the dispense with the thumb, which is not at all onerous, but it has been observed that for a long thin plastic laboratory tube, even slight unsteadiness of a person's hand can throw off the aim and let the sample get close enough to the plastic wall to be grabbed by electrostatic forces. Put differently, the unique ability of the instant invention to shoot a small sample out contact free may make the user's hand the limiting factor if a long thin plastic tube is used. The soft energy release switch 69 is intended to minimize what can be thought of as recoil of the user's hand to improve the aim. It is to be emphasized that although the spring that captures the energy of the hand is located near the tip, that spring does not give up its energy at that location to the tip having anything to do with tip ejection, which might be suggested by the position, but rather it transfers the stored energy by any one of a number of other mechanisms, which are not detailed here, so that the energy can be unleashed by the soft energy switch to do the contact-free dispense of the sample.

Figure 22A:
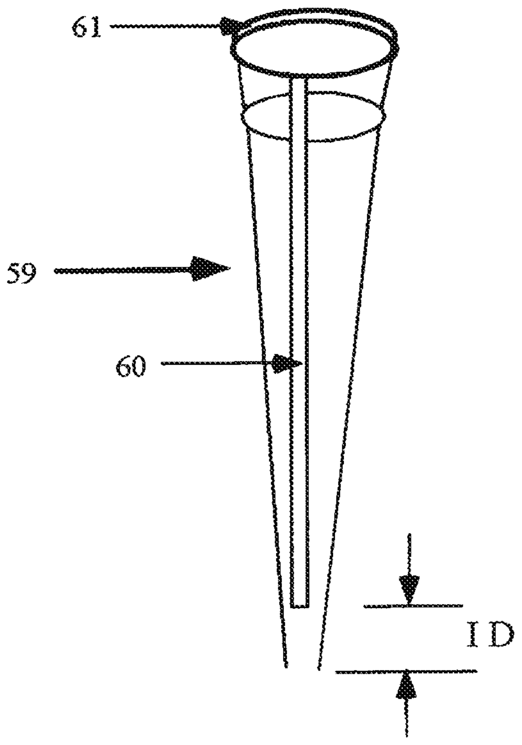
FIGS. 22A and 22B show an electrically conductive transparent tip to help guide users for more accurate sub-microliter pipetting.
Figure 22B:
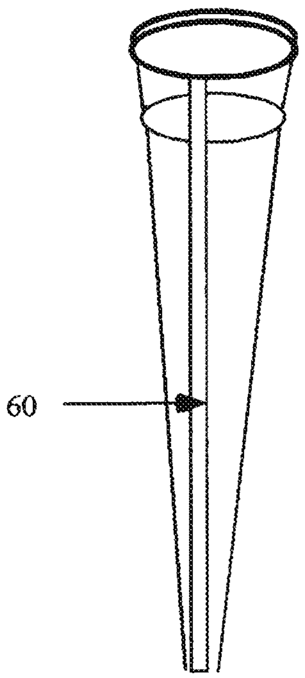

FIGS. 22A and 22B depict a transparent disposable tip with an electrically conductive strip 60 that can be used in conjunction with other capabilities to provide the user with information about the relationship between the tip and the sample that will improve pipetting accuracy of submicroliter volumes. A conductive ring 61 on the inside of the top of the tip lets a conductive tip mandrel, such as stainless steel, picks up the signal, which can be read and interpreted at various levels of sophistication by an electronic chip. The conductivity may be in the range of maximum resistance of 30 K ohms end to end. Such tips have been developed by Eppendorf (US2013/013 6672) and probably others. FIG. 22A shows a tip in which the conductive strip 60 stops short of the tip by a small ID "insertion depth" distance, such as 1-2 mm. FIG. 22B shows a tip in which the conductive strip 60 extends to the bottom. This can be utilized to great advantage to improve pipetting of tiny volumes by the current invention because the extreme precision and accuracy of the aspiration can easily make over-dipping the tip the cause of main error and weakest point in the sub-microliter pipetting process. A completely manual embodiment of the present invention would have a green LED indicator or a red LED indicator. This could be used in a frame embodiment similar to that shown in FIG. 11C, with a similar simple battery 48 and simple electronic package 47. This might preferably use the simpler conductive tip of FIG. 22A, which lights up a red LED or a green LED if the tip is dipped deeper than, for example, 2 mm. There are many obvious combinations of signals to be used to remind the manual pipetting user of the importance of not dipping too deep if the unique precision and accuracy of the instant invention is not to be compromised. Alternatively, a motorized handheld embodiment of the present invention could be used in a more sophisticated motorized embodiment, similar to the frame embodiment previously show in FIG. 11D. This might utilize both a red LED and a green LED and a more intelligent display 40 and smarter electronic package 47 and maybe a pleasing or unpleasant sound chip to issue status information, all designed to take fullest advantage of the extremely reliable and precise core aspirating and dispensing capabilities of the instant invention, which themselves may make the depth that the user dips the tip a gating factor in the precision and accuracy that can be obtained.

Embodiments of the invention include various technical features and advantages which we have described, including using a top rod that is thinner than the bottom tube, a basic arrangement according to one embodiment that allows the system to operate in the intuitive and conventional way of moving something up or out to pull a liquid up or in—to aspirate—or to push a liquid down or out—to dispense it. Such an arrangement lets anyone pipette by hand with the usual ingrained thumb movements, thereby overcoming the resistance that would be encountered to learn any new pipetting sequence. Even for use in automated systems, programmers and system engineers can most fully utilize their established logic with the embodiment described. However, any other way that brings the 3 elements (cylinder, rod and tube) into the same relative positions will technically produce similar results. Another technical advantage includes aspirating small samples without misses or short sample "outliers". The large diameter pistons made possible by the offset displacement mechanism permit use of adequately thick-walled and compliant O-ring seals that do not crack and leak like the tiny seals needed for fine conventional pipettors. The substantial lack of leaking means that the user does not need to inspect the tips each time and that automated systems do not need to rely on duplicate or triplicate measurements, or on additional and sometimes complex technologies to verify liquid presence, to protect against the known phenomenon of such short sample or outliers. Another technical advantage includes dispensing by slow flow to hanging drop. By making the rod thinner than the cylinder the dispensing can be done in high resolution, low flow offset displacement mode to give a hanging drop. People can therefore deliver by the same hanging drop technique they are accustomed to, which is typically "touchoff-and-drag". Yet another technical advantage includes dispensing by high flow contact-free. By allowing the bottom tube to close the inter-piston gap alone, without offset from the top rod, the dispensing can also be done in the low resolution, high flow, single displacement mode. This is done by dispensing all the way to the bottom to blow the liquid out contact-free, something which can be done after pausing at the first resistance stop so that an intermediary hanging drop may sometimes be seen or by moving all the way to the bottom without a pause so that no hanging drop is ever seen. Yet another technical advantage includes giving the cylinder (chamber) an external air bleed that operates only when the cylinder moves down or in (not up or out) through the offset displacement zone, preventing any aspirated sample from being moved down during what would otherwise be a low flow, offset displacement mode. Then when the movement enters the single displacement zone the dispensing occurs, solely in the high-velocity, blow-off style as if no offset displacement zone existed. This feature can be built into the units or also be provided in a form that can be selected by the user. This has the practical effect of letting the user decide which or both of the two dispensing means is preferred. One design for such an external air bleed or shunt may be a hole up through the rod, making it into a top tube, which hole is intermittently sealed. Yet another technical advantage is that by tapering the end of the rod or tube we can increase the fineness of resolution by an additional order of magnitude or even greater for the tiniest volume samples. This can be done because the offset displacement principle lets us use stout rods and tubes that can use thick-walled and compliant O-ring seals that have enough flexible "give" in them to allow the same seal to seal effectively over a wider diameter range (such as 0.001-0.014") throughout the taper. One unit can therefore cover the range 0.2 μL-10 μL, or even 0.2 μL to 20 μL with high precision, a 100-fold range as opposed to the standard 10-fold range limitation imposed for high precision and practical handling with conventional pipettors. This may be accompanied by a volume readability scale that is different from the conventional 3-levels of numbered rings because the resolution is not linear, lending itself well either to the sloped vernier scale with the viewing window that we have or to electronic logic. Yet another technical advantage is that vigorous mixing can be done in the single displacement mode that exceeds by 10 to 100 times the velocity and mixing efficiency of a conventional pipettor with comparable small volume aspiration resolution and precision. Yet another technical advantage is using a self-contained motor, like a Maxon, with a digital display and software intelligence control. The user's thumb therefore does not need to cause the movements that aspirate or dispense because those movements are called out by the intelligence in the controller unit. The intelligent motorized can also cause precise repetitive movements in the same direction without needing any mechanical stop, which the thumb alone cannot do. The motorized controller therefore provides several additional unique capabilities that can further exploit various of the embodiments described herein, including maintaining automatic calibration. Yet another technical advantage is to use an electronic controller for any non-linear volume resolution calculations and associated volume display of the powerful range-expanding rod taper, and to automatically move the cylinder between the exact positions needed for getting the maximum precision and accuracy for the desired volume. Yet another technical advantage is to do repetitive dispensing of the tiniest volumes very precisely in the unique offset displacement or in the high flow mode for contact-free delivery. Yet another technical advantage is to use an internal tip stripper that is very neatly driven from inside. Yet another technical advantage is that to reflect the non-linear resolution of the cylinder taper a printed non-linear vernier grid label can be printed and used. Yet another technical advantage is to use a combined bottom tube and tip mandrel for a fixed volume unit to simultaneously minimize total internal air and disposable tip dead air space for the fixed volume application. Yet another technical advantage is a large viewing and ventilating window that lets the operator actually see the unique operating mechanism and also stabilizes the operating temperature. The omnipresent ambient air circulates freely within the unit and maintains the entire operating system at substantially the same temperature as the liquid samples. For an adjustable model, use of a temperature thermistor and embedded software will permit a more precise volume reading that runs the mechanical setting through a temperature algorithm. Yet another technical advantage is for a fixed volume unit with significantly reduced manufacturing cost. Use of only a machined or molded inner tube without an outside handle may reduce costs further. This combined piece can be used with only the machined or molded inner sleeve without an outside molded handle. Or the combined piece can nest solidly in or outside a molded handle without the need for an inner sleeve. Yet another technical advantage is to use a tip injector that is internal to the frame in a smaller and neater package than in most conventional pipettor tip ejectors. And finally but not least, another technical advantage is that the long open window maintains ambient temperature throughout and also shows the key mechanism and operating mechanical system. This avoids the need for common practices like wrapping insulating material around a handheld unit so that a person's hand heat cannot cause small volume variations.

The parts that have been identified and referenced in the discussion are:

1 Cylinder
2 O-ring Seal, top
3 O-ring Seal, bottom
4 Top Rod
5 Bottom Tube
6 Tube channel
7 Groove
8 Chamber
9 Air gap, interpiston
10 Disposable tip
11 Sample
12 Hanging drop
13 Tapered rod (piston) downward
14 Handle
15 Sleeve, supporting frame
16 Pusher knob and volume adjuster

17 Window
18 Tip ejector button
19 Tip ejector rod
20 Tip ejector
21 Mandrel
22 Tip ejector spring
23 Mandrel knob or flange
24 Sleeve nose
25 Holding flange
26 Cross Pin
27 Top Rod Slot
28 Pusher Slot
29 Pusher Stalk
30 Pusher Body
31 Spring floor
32 Top Rod Spring
33 Pusher Spring
34 Pusher Stalk Bottom
35 Top Rod top
36 Aspiration distance
37 Tip inside retention liquid
38 Tip outside retention liquid
39 Motor
40 Intelligent display
41 Volume display option
42 Extension shaft
43 Vernier scale
44 Volume viewing hole
45 Encoder disc or dial
46 Optical detectors or magnetic strip
47 Electronic package
48 Battery
49 Temperature thermistor
50 Rod sealing valve latch
51 Rod controller/connector pin
52 Rod controller/connector pin spring
53 Release switch
54 Threads
55 Tube mandrel combined
56 Mandrel extension filler
57 Valve, tube
58 Tip ejector pins, internal
59 Tip, Conductive transparent disposable
60 Tip, longitudinal external conductive strip
61 Tip, circumferential internal conductive band
62 Water glass thick rod
63 Water glass thin rod
64 Water glass annular ring cross section difference
65 Very thin piston with cross section area same as annular ring area
66 Water glass water level
67 Contact-free blowout dispense
68 Available disposable tip space
69 Energy release switch
70 Tip flange catch
71 Mandrel spring or energy catcher

What is claimed is:

1. An apparatus for accurately and reliably metering of liquid volumes comprising:

a cylinder holding a dimensionally variable seal at each end that defines a chamber and takes into the chamber a downwardly tapered piston from above, the downwardly tapered piston having a varying diameter, and wherein the greatest diameter being at the top of the downwardly tapered piston, and a tube from below, the tube having a diameter, the greatest diameter of the downwardly tapered piston being less than the diameter of the tube, and the cylinder, downwardly tapered piston and tube being concentric and co-axial to each other, the seal being thick and compliant enough to maintain a good and stable seal against the tube and downwardly tapered piston, the cylinder configured and arranged to slidably move up over said downwardly tapered piston and tube to release a portion of the tube from the cylinder while taking in an additional similar portion of the downwardly tapered piston, thereby increasing a volume of air in the chamber and to create a negative pressure or vacuum therein, the cylinder further configured and arranged to slidably move down over the downwardly tapered piston and tube to release a portion of the downwardly tapered piston from the cylinder while taking in an additional similar portion of the tube, thereby reducing the volume of air in the chamber and to create a positive pressure therein, said downwardly tapered piston configured and arranged to move with the cylinder by a same distance as the cylinder moves, so that the tube moves alone within the cylinder with no offsetting movement of the downwardly tapered piston in the cylinder, thereby causing a change in the volume of air in the chamber, a probe or mandrel that can hold a disposable tip, that is part of or attachable to the tube, extending downward with an inner channel that is one with or continuous with that of the tube and which can sample from a liquid, each of the foregoing parts being supported within a frame or sleeve, the frame or sleeve having a top end, so as to comprise a handheld pipettor, which supporting sleeve may itself nest within a molded handle or be absent if its support functions are provided by the molded handle, wherein a lower end of the frame or sleeve holds a tube or tube mandrel concentric thereto, and wherein a top end of the frame or sleeve holds a knob with a stalk that threads down into a movable pusher that holds the cylinder below, such that by moving the knob an operator can move the cylinder up and down to aspirate or dispense liquid, and wherein the knob is configured and arranged to be turned to adjust a distance to a top of the downwardly tapered piston to define an aspiration volume, said apparatus further comprising a viewing window in the knob that shows a vernier label corresponding to an aspiration value that has been selected, said apparatus further comprising a hole in the sleeve and molded handle that permits ambient air temperature regulation as well as viewing of an interior of said apparatus, and a disposable tip-stripper ejection switch coupled to said disposable tip so as to disengage said disposable tip from said apparatus.

2. The apparatus of claim 1 in which a ball valve in the tube is added to inactivate a low flow dispensing phase of said apparatus.

3. The apparatus of claim 2, further comprising a controller pin for eliminating said low flow dispensing phase.

4. The apparatus of claim 3, wherein said controller pin is used to minimize an interpiston space.

5. The apparatus of claim 1 further comprising a valve and controller pin that eliminate an interpiston space before sample aspiration and restore said interpiston space for contact-free dispensing delivery.

6. The apparatus of claim 1 further comprising an interchangeable tube and mandrel combination to vary an air space at an upper and at a lower end of said apparatus.

7. The apparatus of claim 1 further comprising a self-contained motor and smart display.

8. The apparatus of claim 1, further comprising a smart motorized motor that is self-calibrating and configured and arranged for volume adjustment and viewing within said apparatus.

9. The apparatus of claim 1, further comprising a compressed spring operated by an optical sensor for storing energy during tip pickup.

10. The apparatus of claim 1 further comprising an electrically conductive transparent tip at a lower end thereof.

11. The apparatus of claim 1 being a fixed volume unit and further comprising a combined tube and mandrel to optimally minimize an air space therein by being configured and arranged for extending the tube up to reduce and interpiston space and to extend the mandrel down into the tip.

* * * * *